United States Patent
Chan et al.

(10) Patent No.: US 10,773,830 B2
(45) Date of Patent: Sep. 15, 2020

(54) FLEXIBLE TRACK MANUFACTURING SYSTEM AND METHOD

(71) Applicant: The Boeing Company, Chicago, IL (US)

(72) Inventors: Kwok Tung Chan, Seattle, WA (US); Tanni Sisco, Mukilteo, WA (US); Eric M. Reid, Kenmore, WA (US); Jeffrey Martin Devlin, Seattle, WA (US)

(73) Assignee: The Boeing Company, Chicago, IL (US)

( * ) Notice: Subject to any disclaimer, the term of this patent is extended or adjusted under 35 U.S.C. 154(b) by 104 days.

(21) Appl. No.: 15/963,148

(22) Filed: Apr. 26, 2018

(65) Prior Publication Data

US 2019/0329905 A1    Oct. 31, 2019

(51) Int. Cl.
  *B21J 15/28*    (2006.01)
  *B64F 5/10*    (2017.01)
  *B25J 5/02*    (2006.01)

(52) U.S. Cl.
  CPC .............. *B64F 5/10* (2017.01); *B25J 5/02* (2013.01); *Y10S 901/01* (2013.01)

(58) Field of Classification Search
  CPC .............. B64F 5/10; B25J 5/02; Y10S 901/01
  See application file for complete search history.

(56) References Cited

U.S. PATENT DOCUMENTS

| | | | |
|---|---|---|---|
| 3,575,364 A | 4/1971 | Frederick | |
| 6,073,326 A * | 6/2000 | Banks | B21J 15/10 227/110 |
| 6,843,328 B2 | 1/2005 | Boyl-Davis et al. | |
| 7,406,758 B2 | 8/2008 | Jones et al. | |
| 7,488,144 B2 | 2/2009 | Boyl-Davis et al. | |
| 7,794,183 B2 | 9/2010 | Wright et al. | |
| 8,365,376 B2 | 2/2013 | Reid et al. | |
| 2003/0116331 A1 | 6/2003 | Boyl-Davis et al. | |
| 2004/0265078 A1 | 12/2004 | Boyl-Davis et al. | |

(Continued)

FOREIGN PATENT DOCUMENTS

| | | |
|---|---|---|
| DE | 102006001385 A1 | 6/2007 |
| EP | 0917920 A2 | 5/1999 |

(Continued)

OTHER PUBLICATIONS

European Patent Search and Communication Report from the Office of the Netherlands with English Translation, dated Jan. 25, 2019, regarding Application No. NL2020976, 14 pages.

(Continued)

*Primary Examiner* — Jun S Yoo
(74) *Attorney, Agent, or Firm* — Yee & Associates, P.C.

(57) ABSTRACT

A method for installing a flexible track system is presented. At least one of a number of heights or a number of angles is selected for a variable height base system that connects a base attaching system and flexible tracks in the flexible track system to each other, wherein at least one of the number of heights or the number of angles for the variable height base system maintains at least one of a desired distance between the flexible tracks and a surface of a structure to which the base attaching system is attached to the flexible tracks in the flexible track system matching a contour of the surface of the structure. The flexible track system is attached to the surface of the structure.

42 Claims, 16 Drawing Sheets

(56) References Cited

U.S. PATENT DOCUMENTS

2004/0265081 A1* 12/2004 Buttrick, Jr. ............ B23B 35/00
408/76
2008/0181733 A1 7/2008 Wright et al.
2015/0314446 A1 11/2015 Day et al.

FOREIGN PATENT DOCUMENTS

| EP | 1563950 A1 | 8/2005 |
| EP | 2564989 A2 | 3/2013 |
| EP | 1463605 B1 | 2/2016 |
| WO | WO2010019320 A1 | 2/2010 |
| WO | WO2011062594 A1 | 5/2011 |

OTHER PUBLICATIONS

Chan, Jr. et al., "Automated Fastening Machine Using a Compound Contour Vacuum Track for Automation of Final Assembly from the Interior of a Fuselage," U.S. Appl. No. 15/365,441, filed Nov. 30, 2016, 58 pages.

Chan, Jr. et al., "Compound Contour Vacuum Track for Automation of Final Assembly from the Interior of a Fuselage," U.S. Appl. No. 15/365,426, filed Nov. 30, 2016, 58 pages.

European Search Report, dated Oct. 4, 2019, regarding Application No. 19163759.4, 3 pages.

European Office Action, dated Oct. 22, 2019, regarding Application No. 19163759.4, 6 pages.

* cited by examiner

FLEXIBLE TRACK MANUFACTURING SYSTEM AND METHOD

BACKGROUND INFORMATION

1. Field

The present disclosure relates generally to a manufacturing system and, in particular, to a method, an apparatus, and a system for performing manufacturing operations using a flexible track manufacturing system.

2. Background

Manufacturing an aircraft can involve assembling large numbers of components to form the aircraft. For example, an aircraft in the form of a midsize commercial jetliner may have millions of parts that are manufactured and assembled to form the jetliner.

Assembling parts into structures that include assemblies and subassemblies may be performed using fastener systems. Factory level automation for aircraft assembly includes the automated drilling of holes and insertion of fasteners. For example, the joining of different sections of a fuselage for an aircraft may be automated utilizing equipment such as robotic arms and flex track crawlers.

The fuselage of an aircraft may comprise a monocoque or semi-monocoque shell in which a series of hoop-wise frames in the shape of the fuselage cross sections are attached to longitudinal stringers. This structure is covered with a skin material. Most modern large aircraft use several large fuselage sections, which are joined by fastening, riveting, or bonding to form the complete fuselage for the aircraft.

Tracks systems may be attached to the inner mold line side or outer mold line side of the fuselage section. With this type of system, a single track or a dual track can be attached to the surface of the fuselage. These types of tracks are often attached to the surface of the fuselage using a vacuum system in which vacuum cups connected to the tracks apply a vacuum to hold the tracks on the surface of the fuselage. A robot, such as a crawler robot, is connected to the tracks and moves along the tracks to perform manufacturing operations such as drilling holes and installing fasteners.

Currently used track systems, however, are unable to maintain a constant distance to the surface of the fuselage in sections of the fuselage that curve. Some fastener installation systems require a specific distance or offset from the surface of the fuselage to install fasteners. When the distance changes beyond the specified height, fasteners may not be installed or may not be installed correctly.

Therefore, it would be desirable to have a method and apparatus that take into account at least some of the issues discussed above, as well as other possible issues. For example, it would be desirable to have a method and apparatus that overcome a technical problem with attaching a track system that maintains a desired distance from the surface of a structure on which manufacturing operations are performed.

SUMMARY

An embodiment of the present disclosure provides a vacuum track manufacturing system comprising flexible tracks, a base attaching system, and a variable height base system connecting the base attaching system and the flexible tracks to each other in which the variable height base system has heights selected to maintain a desired distance between the flexible tracks and a surface of a structure to which the base attaching system is attached.

Another embodiment of the present disclosure provides a method for moving a crawler robot on a surface of a structure. A crawler is moved on a flexible track system attached to the surface of the structure in which the flexible track system comprises flexible tracks, a base attaching system, and a base system connecting the base attaching system and the flexible tracks to each other, and in which the base system enables the flexible tracks to bridge structural frames on the surface of the structure. Manufacturing operations are performed on the structure using the crawler robot.

Yet another embodiment of the present disclosure provides a method for installing a flexible track system. At least one of a number of heights or a number of angles is selected for a variable height base system that connects a base attaching system and flexible tracks in the flexible track system to each other, wherein at least one of the number of heights or the number of angles for the variable height base system maintains at least one of a desired distance between the flexible tracks and a surface of a structure to which the base attaching system is attached to the flexible tracks in the flexible track system matching a contour of the surface of the structure. The flexible track system is attached to the surface of the structure.

Another embodiment of the present disclosure provides a vacuum track manufacturing system comprising flexible tracks comprising a first flexible track and a second flexible track in which the first flexible track and the second flexible tracks are configured to bend to correspond to a contour in a surface of a structure, a vacuum cup system, a variable height base system connecting the vacuum cup system and the flexible tracks to each other, a flexible track system in which the variable height base system has heights that are selected to maintain a desired distance between the flexible tracks and the surface of the structure to which the vacuum cup system is attached in which the variable height base system comprises: frames connected to the flexible tracks; bases connected to the frames in which the frames of the bases have the heights selected to maintain the flexible tracks at the desired distance from the surface of the structure such that the flexible tracks match a contour of the structure, in which a base in the bases is configured to set an angle for a flexible track in the flexible tracks connected to the base such that the flexible track matches a contour of the structure at a location for the flexible track by at least one of being rotatably connected to a frame in the frames to set the angle for the flexible track connected to the frame in a manner that causes the flexible track to match the contour of the structure at the location of the flexible track on the structure or having an angled end connected to the frame in which the angled end has the angle that causes the flexible track to match the contour of the structure at the location of the flexible track on the structure; a positioning system, wherein the positioning system extends from the variable height base system and is configured to connect to a group of features for the structure to position the flexible track system in a desired position on the structure for performing properly manufacturing operations on the structure; spreader bars configured to connect to the first flexible track and second flexible track such that a desired span is present between the first flexible track and the second flexible track; and a crawler robot configured to move along the flexible tracks and perform the manufacturing operations on the structure.

Yet another embodiment of the present disclosure provides a method for moving a crawler robot on a surface of a structure. A flexible track system is connected relative to a group of features for the structure using a positioning system to position the flexible track system in a desired position on the structure for properly performing manufacturing operations. The flexible track system is attached to the to the surface of the structure in which the flexible track system comprises flexible tracks, a vacuum cup system, and a variable height base system having frames and bases connecting the vacuum cup system to the flexible tracks, in which the bases are connected to vacuum cups and the frames, in which a base in the bases has a height selected to maintain a flexible track in the flexible tracks at a desired distance from the surface of the structure at a location of the structure selected for the base such that the flexible tracks match a contour of the structure, in which the base is configured to set an angle for the flexible track connected to the base such that the flexible track matches a contour of the structure at a location for the flexible track by at least one of being rotatably connected to a frame in the frames to set the angle for the flexible track connected to the frame in a manner that causes the track to match the contour of the structure at the location of the track on the structure or having an angled end connected to the frame, in which the angled end has the angle that causes the flexible track to match the contour of the structure at the location of the flexible track on the structure. The crawler robot is attached to the flexible track system. The crawler robot it moved on the flexible track system attached to the surface of the structure. Manufacturing operations on the structure are performed using the crawler robot.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations. For example, the illustrative embodiments recognize and take into account that currently used track systems may have flexible tracks. However, the illustrative embodiments recognize and take into account that the current framework connecting the flexible tracks to the curved surface, however, are not selectable to take into account the contour in the surface of the structure.

The illustrative embodiments also recognize and take into account that the angle at which the tracks are held by the framework in a track system also does not take into account maintaining a desired angle for the flexible tracks with respect to the surface of the structure. For example, the illustrative embodiments recognize and take into account that with currently used fastener installation systems, the tool on a crawler robot operates with the tool being substantially perpendicular to the surface of the structure. When that angle deviates more than some threshold amount, the fasteners cannot be installed by the crawler robot.

Thus, the illustrative embodiments provide a method, an apparatus, and a system for a vacuum track manufacturing system. In one illustrative example, a vacuum track manufacturing system comprises flexible tracks, vacuum units, and a variable height base system. The variable height base system connects the vacuum cup system and the flexible tracks to each other. The variable height base system has heights that are selected to maintain a desired distance between the flexible tracks and a surface of a structure to which the vacuum cup system is attached.

Figure 1:
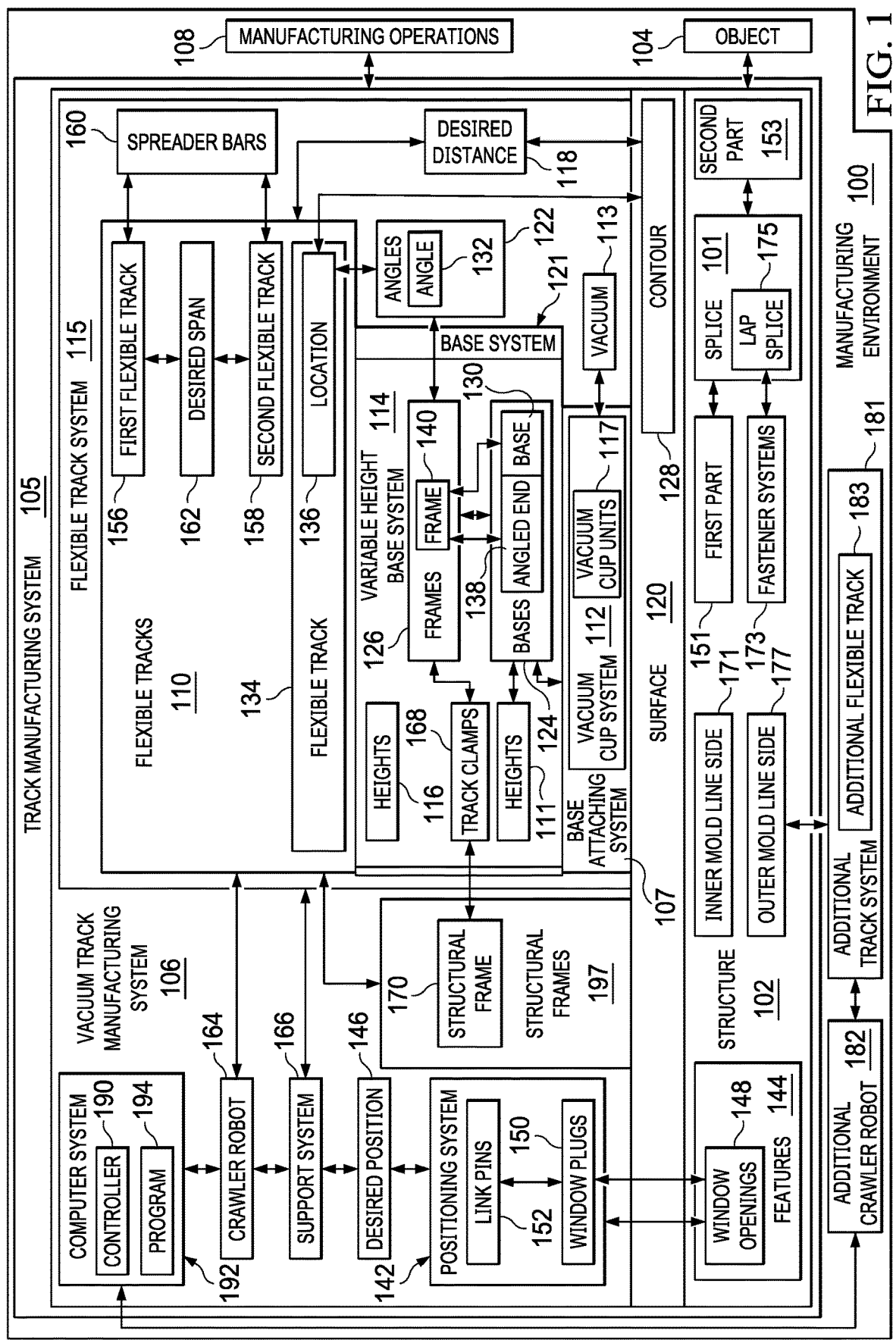
FIG. 1 is an illustration of a block diagram of a manufacturing environment in accordance with an illustrative embodiment.

With reference now to the figures and, in particular, with reference to FIG. 1, an illustration of a block diagram of a manufacturing environment is depicted in accordance with an illustrative embodiment. Manufacturing environment 100 is an environment in which structure 102 can be manufactured for object 104 using track manufacturing system 105.

In the illustrative example, structure 102 can take a number of different forms. For example, structure 102 can be selected from a group comprising an assembly, a subassembly, a fuselage section, a wing, a wing box, a horizontal stabilizer, a landing gear system, a hydraulic system, a skin panel, a stringer, a fuselage section, a composite fuselage section, and other suitable structures.

Object 104 may take a number of different forms. For example, object 104 may be, for example, a mobile platform, a stationary platform, a land-based structure, an aquatic-based structure, and a space-based structure. More specifically, object 104 can be a surface ship, an aircraft, a tank, a personnel carrier, a train, a spacecraft, a space station, a satellite, a submarine, an automobile, a power plant, a bridge, a dam, a house, a manufacturing facility, a building, and other suitable types of objects.

In this illustrative example, track manufacturing system 105 operates to perform manufacturing operations 108 to manufacture structure 102. Manufacturing operations 108 can take a number of different forms. For example, manufacturing operations 108 can be selected from at least one of drilling, machining, performing inspections, painting, applying sealant, cutting, installing fasteners, or other types of manufacturing operations 108 performed to manufacture structure 102.

As used herein, the phrase "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item C. This example also may include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

In this illustrative example, vacuum track manufacturing system 106 includes a number of different components. As depicted, track manufacturing system 105 comprises flexible tracks 110, base attaching system 107, and base system 121, which form flexible track system 115 for track manufacturing system 105. In this illustrative example, base attaching system 107 can be vacuum cup system 112 with track manufacturing system 105 being vacuum track manufacturing system 106. In other examples, base attaching system 107 can take other forms other than vacuum cup system 112 using vacuum 113. For example, base attaching system 107 can be attached to structure 102 using at least one of fasteners that engage slots or holes in structure 102, clamps, or other suitable attachment mechanisms that can be used to attach flexible track system 115 to surface 120 of structure 102.

Base system 121 is configured to maintain desired distance 118 between flexible tracks 110 and surface 120 of structure 102. In this illustrative example, base system 121 connects vacuum cup system 112 and flexible tracks 110 to each other. Vacuum cup system 112 attaches flexible track system 115 to surface 120 of structure 102 when vacuum 113 is applied by vacuum cup system 112. In the depicted example, vacuum cup system 112 comprises vacuum cup units 117. As depicted, base system 121 includes variable height base system 114, which is connected to vacuum cup system 112 and flexible tracks 110. Base system 121 is configured in a manner in which base system 121 enables flexible tracks 110 to bridge structural frames 197 on surface 120 of structure 102. Structure frames 197 can include at least one of stringers, frames, intercostals, hoop frames, ribs, or other structural elements for structure 102. Structural frames 197 can be located on inner mold line side 171, outer mold line side 177, or both.

Base system 121 is configured to maintain desired distance 118 between flexible tracks 110 and surface 120 of structure 102 with contour 128 to which vacuum cup system 112 is attached.

In this illustrative example, variable height base system 114 has heights 116 that are selected to maintain desired distance 118 between flexible tracks 110 and surface 120 of structure 102 to which vacuum cup units 117 in vacuum cup system 112 are attached when vacuum 113 is applied. In the illustrative example, desired distance 118 can be the same over the entire length of flexible tracks 110. In other illustrative examples, desired distance 118 may vary depending on stations for tools used to perform manufacturing operations 108 at different locations along the length of flexible track system 115.

Further, variable height base system 114 can also be configured to set angles 122 for flexible tracks 110 relative to surface 120 of structure 102. In the illustrative example, surface 120 can be of an inner mold line (IML) side and an outer mold line (OML) side of structure 102.

In the illustrative example, variable height base system 114 is comprised of a number of different components. As depicted, variable height base system 114 comprises bases 124 and frames 126. Frames 126 are connected to bases 124 and flexible tracks 110. Bases 124 are connected to vacuum cup system 112.

As used herein, a first component, frame 140 in frames 126, "connected to" a second component, base 130 in bases 124, means that the first component can be connected directly or indirectly to the second component. In other words, additional components may be present between the first component and the second component. The first component is considered to be indirectly connected to the second component when one or more additional components are present between the two components. When the first component is directly connected to the second component, no additional components are present between the two components.

Bases 124 have heights 111 selected to maintain flexible tracks 110 at desired distance 118 from surface 120 of structure 102. Desired distance 118 may be such that flexible tracks 110 match contour 128 of structure 102. Contour 128 is for surface 120 of structure 102. In the illustrative example, flexible tracks 110 are configured to bend to correspond to contour 128 in surface 120 of structure 102. In this example, flexible tracks 110 are configured to bend to correspond to contour 128 of surface 120 of structure 102 such that crawler robot 164 properly performs manufacturing operations 108.

In one illustrative example, base 130 in bases 124 is configured to set angle 132 for flexible track 134 in flexible tracks 110 connected to base 130 such that flexible track 134 matches contour 128 of structure 102 at location 136 for flexible track 134. In other words, flexible track 134 has a track contour that matches contour 128. In the illustrative example, the match is present when two contours are substantially the same or close enough to provide a desired level of performance in performing manufacturing operations 108.

Base 130 can set angle 132 in a number of different ways. For example, base 130 can have angled end 138 connected to frame 140, wherein angled end 138 has angle 132 that causes flexible track 134 to match contour 128 of structure 102 at location 136 of flexible track 134 on structure 102.

In another illustrative example, frame 140 in frames 126 is rotatably connected to base 130 to set angle 132 for flexible track 134 connected to frame 140. Angle 132 can be set in a manner that causes flexible track 134 to match contour 128 of structure 102 at location 136 of flexible track 134 on structure 102.

Vacuum track manufacturing system 106 can also comprise positioning system 142. In the illustrative example, positioning system 142 extends from variable height base system 114 and is configured to connect to a group of features 144 for structure 102 to position flexible track system 115 in desired position 146 on structure 102 for properly performing manufacturing operations 108. As used herein, "a group of," when used with reference to items, means one or more items. For example, "a group of features 144" is one or more of features 144. Further, positioning system 142 also can provide support for flexible tracks 110 in case a vacuum loss occurs in vacuum cup system 112 while vacuum cup system 112 is attached to surface 120 of structure 102.

In one illustrative example, the group of features 144 comprises a group of window openings 148 in structure 102. Positioning system 142 in this example comprises a group of window plugs 150 and link pins 152 that connect the group of window plugs 150 to the variable height base system 114, and wherein flexible track 134 has desired position 146 on surface 120 of structure 102 when the group of window plugs 150 is connected to window openings 148.

Further, flexible tracks 110 may comprise first flexible track 156 and second flexible track 158 that are parallel to each other. Spreader bars 160 may be configured to connect first flexible track 156 and second flexible track 158 to each other such that desired span 162 is present between first flexible track 156 and second flexible track 158. In this illustrative example, desired span 162 may be the same throughout the length of first flexible track 156 and second flexible track 158. In this example, desired span 266 allows crawler robot 164 to properly move along flexible tracks 110 in flexible track system 115. If desired span 266 is absent, crawler robot 164 may be unable to move along the entire length of flexible tracks 110 as desired.

Flexible track system 115 can also include a number of track clamps 168. The number of track clamps 168 are connected to frames 126. For example, the number of track clamps 168 can be connected to frames 126 for second flexible track 158. The number of track clamps 168 is configured to clamp features, such as structural frame 170 on structure 102. The use of the number of track clamps 168 increases track rigidity. Additionally, the number of track clamps 168 can secure second flexible track 158 to structure 102 while first flexible track 156 is secured to structure 102 by positioning system 142.

Structure 102 may have splice 101. When splice 101 is present, flexible track system 115 can be placed such that first flexible track 156 and second flexible track 158 in flexible tracks 110 are positioned in parallel to splice 101 in structure 102. As depicted, the positioning can be set using link pins 152 for window plugs 150. The placement of first flexible track 156 and second flexible track 158 in flexible tracks 110 can be made such that a splice plate, butt splice, or other splicing feature in splice 101 are between flexible tracks 110. In this example, first flexible track 156 and second flexible track 158 are in parallel with splice 101.

In this illustrative example, vacuum track manufacturing system 106 further comprises crawler robot 164. In this particular example, crawler robot 164 is configured to move along flexible tracks 110 and perform manufacturing operations 108.

As depicted, support system 166 can be configured to position crawler robot 164 on flexible tracks 110. Support system 166 can also be configured to position flexible track system 115 at desired position 146 to be attached to surface 120 of structure 102 at desired position 146. The positioning by support system 166 can be for at least one of crawler robot 164 or flexible track system 115 at desired position 146.

In one illustrative example, flexible track system 115 and crawler robot 164 are located on inner mold line side 171 of structure 102. Vacuum track manufacturing system 106 also comprises additional track system 181 located on outer mold line side 177 of structure 102 and additional crawler robot 182 configured to move along additional flexible track 183 in additional track system 181 and perform manufacturing operations 108.

As depicted, vacuum track manufacturing system 106 also may include controller 190. In this illustrative example, controller 190 is configured to control the operation of crawler robot 164 and additional crawler robot 182. For example, controller 190 can coordinate the operation of crawler robot 164 and additional crawler robot 182 to perform manufacturing operations 108 on structure 102. This coordination may be performed to install fastener systems 173.

In one illustrative example, controller 190 can coordinate the operation while crawler robot 164 is on inner mold line side 171 and additional crawler robot 182 is on outer mold line side 177. In this example, additional crawler robot 182 is an outer crawler robot and can perform operations comprising at least one of drilling, countersinking the fastener holes, and applying sealant to the bolts in fastener systems 173 prior to driving the bolts into holes. In this depicted example, crawler robot 164 is an inner crawler robot and can perform operations including installing collars or nuts in fastener systems 173 on the bolts fastener systems 173 to complete fastener system installation.

As depicted, the coordination of these operations between the outer crawler robot and the inner crawler robot to make sure that the collar or nut is installed after the fastener is driven into the hole is performed using controller 190. As depicted, one crawler robot may be the slave of the other crawler robot. In other examples, sensors may be used to detect when bolts in faster systems 173 penetrate structure 102 through inner mold line side 171 and then locate and install collars or nuts. Either or both of these types of coordination may be employed. Further, controller 190 can coordinate the outer crawler robot to hold a bolt (installed in the hole) while the inner crawler robot installs a collar or nut. These and other types of coordination between the two crawler robots may be made using controller 190.

As depicted, controller 190 can be implemented in at least one of software or hardware. When software is used, the operations performed by controller 190 may be implemented in program code configured to run on hardware, such as a processor unit. When firmware is used, the operations performed by controller 190 may be implemented in program code and data and stored in persistent memory to run on a processor unit. When hardware is employed, the hardware may include circuits that operate to perform the operations in controller 190.

In the illustrative examples, the hardware may take a form selected from at least one of a circuit system, an integrated circuit, an application specific integrated circuit (ASIC), a programmable logic device, or some other suitable type of hardware configured to perform a number of operations. With a programmable logic device, the device may be configured to perform the number of operations. The device may be reconfigured at a later time or may be permanently configured to perform the number of operations. Programmable logic devices include, for example, a programmable logic array, a programmable array logic, a field programmable logic array, a field programmable gate array, and other suitable hardware devices. Additionally, the processes may be implemented in organic components integrated with inorganic components and may be comprised entirely of organic components excluding a human being. For example, the processes may be implemented as circuits in organic semiconductors. An organic semiconductor is a semiconductor that is comprised of materials such as pi-bonded molecules or polymers made of carbon and hydrogen and may include other elements such as nitrogen, sulfur, and oxygen. These materials are in the form of molecular crystals or amorphous thin films.

Computer system 192 is a physical hardware system and includes one or more data processing systems. When more than one data processing system is present, those data processing systems are in communication with each other using a communications medium. The communications medium may be a network. The data processing systems may be selected from at least one of a computer, a server computer, a tablet, or some other suitable data processing system.

Controller 190 controls the operation of vacuum track manufacturing system 106 and, in particular, crawler robot 164 and additional crawler robot 182 in vacuum track manufacturing system 106 utilizing program 194. Program 194 may be, for example, a computer numerical control (CNC) program or some other suitable program code that may be used to control the operation of vacuum track manufacturing system 106. For example, crawler robot 164 and additional crawler robot 182 can be computer numerical control (CNC) machines which uses cartesian coordinates.

In one illustrative example, one or more technical solutions are present that overcome a technical problem with attaching flexible track system 115 that maintains a desired distance 118 from surface 120 of structure 102 on which manufacturing operations 108 are performed. As a result, one or more technical solutions may provide a technical effect of enabling automation of manufacturing operations 108 on structure 102. For example, the illustrative example may provide one or more technical solutions in which at least one of desired distance 118 or angle 132 is maintained for flexible tracks 110. In other words, desired distance 118, angle 132, or both is maintained for flexible tracks 110. One or more technical solutions enable crawler robot 164 to perform manufacturing operations 108 with at least one of desired distance 118 or angle 132 with respect to surface 120 of structure 102.

For example, one or more technical solutions enable positioning crawler robot 164 such that the tool for crawler robot 164 has an orientation that is substantially perpendicular to surface 120 of structure 102. In this manner, crawler robot 164 can perform manufacturing operations such as machining, installing fasteners, and other types of manufacturing operations that require a particular angle or distance from surface 120 of the structure 102. Desired distance 118 also allows for crawler robot 164 to perform operations. For example, tools for crawler robot 164 may have an operation range based on the distance of crawler robot 164 from surface 120 of structure 102. Maintaining desired distance 118 allows for crawler robot 164 to perform manufacturing operations 108.

The illustration of manufacturing environment 100 in FIG. 1 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, flexible track system 115 has been described as having first flexible track 156 and second flexible track 158 that are parallel to each other. In another illustrative example, flexible track system 115 may be comprised of a single track rather than parallel tracks. In yet another illustrative example, flexible track system 115 may include three tracks in parallel. Further, a track may be either a single track or comprised of sections.

Also, one or more crawler robots in addition to or in place of crawler robot 164 can be connected to flexible track system 115 to perform manufacturing operations 108 at substantially the same time. For example, a first crawler robot may machine holes in structure 102 and a second crawler robot may install the fasteners in structure 102.

Further, flexible track system 115 and crawler robot 164 can be used on inner mold line side 171 to perform the inner portion of the fastener assembly for installing fastener systems 173 in lap splice 175. As a result, flexible track system 115 allows bridging of structural frames 197 for fuselage sections (not shown) providing inner support of stringers (not shown) and skin panels (not shown). Further, flexible track system 115 and crawler robot 164 can also be used on outer mold line side 177 of structure 102.

Figure 2:
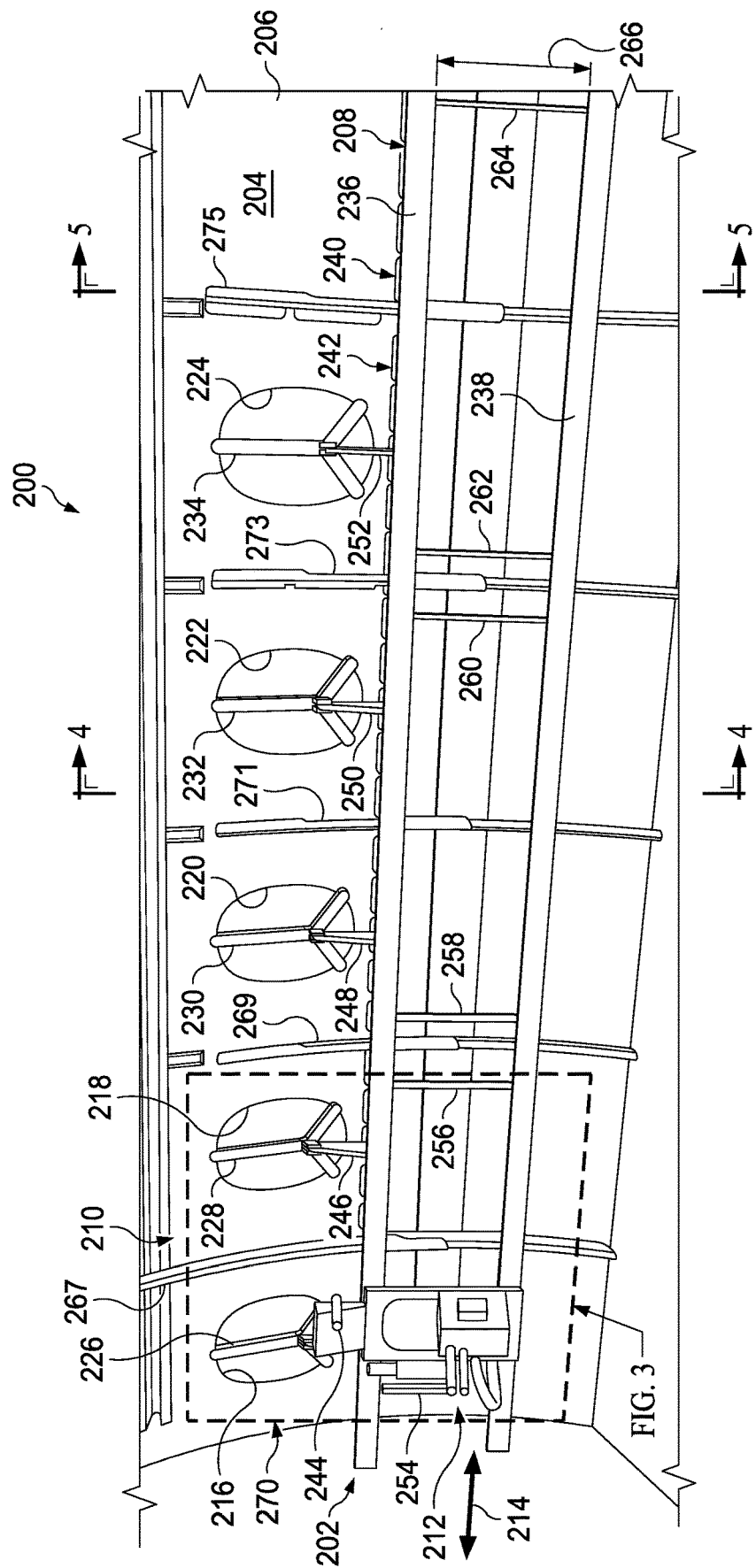
FIG. 2 is an illustration of a manufacturing environment in accordance with an illustrative embodiment.

Turning now to FIG. 2, an illustration of a manufacturing environment is depicted in accordance with an illustrative embodiment. In this illustrative example, manufacturing environment 200 is an example of one implementation for manufacturing environment 100 shown in block form in FIG. 1. As depicted, vacuum track manufacturing system 202 is attached to inner mold line side 204 for fuselage section 206.

Vacuum track manufacturing system 202 comprises a number of different components. As depicted, vacuum track manufacturing system 202 comprises flexible track system 208, positioning system 210, and crawler robot 212.

In the illustrative example, flexible track system 208 is attached to inner mold line side 204 for fuselage section 206. Flexible track system 208 comprises first flexible track 236 and second flexible track 238. Flexible track system 208 also comprises vacuum cup system 240 and variable height base system 242.

Additionally, spreader bar 254, spreader bar 256, spreader bar 258, spreader bar 260, spreader bar 262, and spreader bar 264 are connected to first flexible track 236 and second flexible track 238. The spreader bars maintain desired span 266 between first flexible track 236 and second flexible track 238. The spreader bars can be removed after vacuum cup system 240 has been activated to attach flexible track system 208 to inner mold line side 204 of fuselage section 206.

As depicted in this illustrative example, first flexible track 236 and second flexible track 238 bridge structural frames on fuselage section 206, such as structural frame 267, structural frame 269, structural frame 271, structural frame 273, and structural frame 275.

Crawler robot 212 is attached to flexible track system 208 and can move in the direction of arrow 214 to perform manufacturing operations such as drilling holes, installing fasteners, performing inspections, or other suitable manufacturing operations for fuselage section 206.

Positioning system 210 is connected to window opening 216, window opening 218, window opening 220, window opening 222, and window opening 224. As depicted, window plug 226 is installed in window opening 216, window plug 228 is installed in window opening 218, window plug 230 is installed in window opening 220, window plug 232 is installed in window opening 222, and window plug 234 is installed in window opening 224. In this example, pin 244 connects window plug 226 to variable height base system 242, pin 246 connects window plug 228 to variable height base system 242, pin 248 connects window plug 230 to variable height base system 242, pin 250 connects window plug 232 to variable height base system 242, and pin 252 connects window plug 234 to variable height base system 242.

As depicted, positioning system 210 is also connected to flexible track system 208. In this illustrative example, positioning system 210 provides at least one of positioning flexible track system 208 in a desired position on inner mold line side 204 of fuselage section 206 or supporting flexible track system 208.

Figure 3:
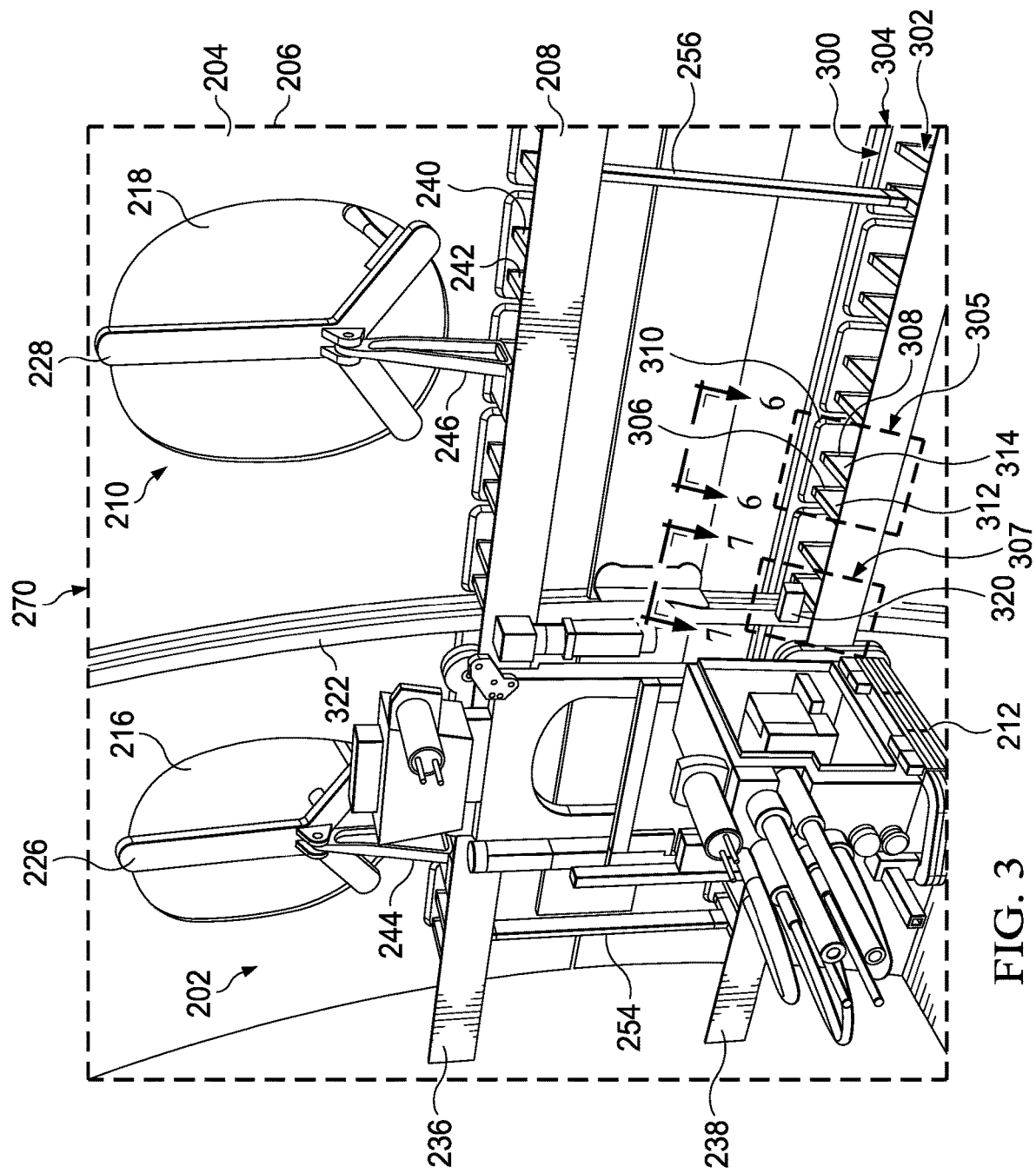
FIG. 3 is an illustration of an enlarged view of a vacuum track manufacturing system in accordance with an illustrative embodiment.

An enlarged view of vacuum track manufacturing system 202 in section 270 is depicted in FIG. 3. With reference now to FIG. 3, an illustration of an enlarged view of vacuum track manufacturing system 202 in FIG. 2 is depicted in accordance with an illustrative embodiment. In the illustrative example, variable height base system 242 comprises bases 300 and frames 302. Bases 300 are connected to vacuum cup units 304 in vacuum cup system 240.

For example, in area 305, base 312 is connected to frame 306 and vacuum cup unit 310. Base 314 is connected to frame 308 and vacuum cup unit 310. Frame 306 and frame 308 are connected to second flexible track 238.

Also, in this enlarged view of section 270, track clamp 320 can be attached to frame 322 of inner mold line side 204 of fuselage section 206. Track clamp 320 is configured to secure second flexible track 238 to frame 322 on inner mold line side 204 of fuselage section 206. Track clamp 320 can be utilized to increase rigidity after spreader bars, such as spreader bar 254 and spreader bar 256, in this view are removed. Further, track clamp 320 in area 307 can reduce the possibility that second flexible track 238 and crawler robot 212 can swing or move in an undesired direction if vacuum is lost by vacuum cup system 240.

Figure 4:
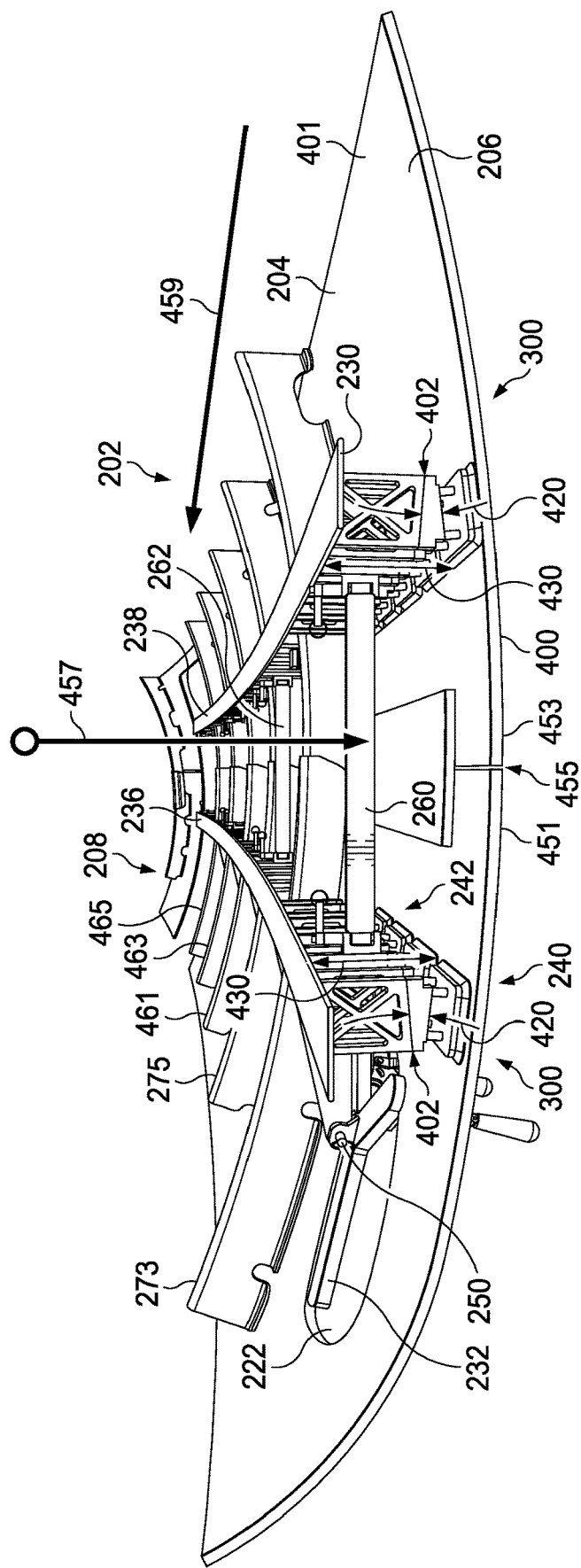
FIG. 4 is an illustration of a cross-sectional view of a vacuum track manufacturing system attached to a fuselage section in accordance with an illustrative embodiment.

With reference next to FIG. 4, an illustration of a cross-sectional view of vacuum track manufacturing system 202 attached to fuselage section 206, both shown in FIG. 2, is depicted in accordance with an illustrative embodiment. As depicted, a cross-sectional view of vacuum track manufacturing system 202 attached to fuselage section 206 is shown taken along lines 4-4 in FIG. 2.

This cross-sectional view provides increased visualization of contour 400 for surface 401 of inner mold line side 204 of fuselage section 206. As depicted in this example, angled ends 402 of bases 300 set number of angles 420 for first flexible track 236 and second flexible track 238. The selection of angle 420 is selected such that first flexible track 236 and second flexible track 238 are substantially perpendicular to surface 401 on inner mold line side 204 of fuselage section 206. For example, angles 420 may be selected such that first flexible track 236 and second flexible track 238 match contour 400 of surface 401 such that first flexible track 236 and second flexible track 238 are substantially perpendicular to surface 401 on inner mold line side 204 of fuselage section 206. In other words, angles 420 vary as radius 457 of fuselage section 206 varies longitudinally. Angles 420 are adjusted to maintain the orientation of first flexible track 236 and second flexible track 238 being substantially perpendicular to surface 401.

Further, bases 300 have a height (not shown) that set desired distance 430 for first flexible track 236 and second flexible track 238 relative to surface 401 of inner mold line side 204 for fuselage section 206. Desired distance 430 can change depending on at least one of the type of crawler robot, type of tool, surface features on surface 401, or some combination thereof at different locations on surface 401 of inner mold line side 204.

In this illustrative example, first flexible track 236 and second flexible track 238 bridge structural frames, such as structural frame 273, structural frame 275, structural frame 461, structural frame 463, structural frame 465. The bridging of these structural frames is enabled through the configuration of variable height base system 242. For example, the figuration of at least one of bases 300, frames 302, or vacuum cup units 304 enable the bridging of the structural frames by first flexible track 236 and second flexible track 238 in flexible track system 208.

Also seen in this example, first flexible track 236 and second flexible track 238 in flexible track system 208 are parallel with each other and with splice 455. In this view, first skin panel 451 and second skin panel 453 in fuselage section 206 are joined at splice 455. As depicted, splice 455 runs longitudinally through fuselage section 206. In this depicted example, splice 455 is a butt splice. As depicted, spreader bar 260 and spreader bar 262 bridge splice 455 when splice 455 is present.

Also shown in this example is a tapering of fuselage section 206. In the illustrative example, radius 457 for fuselage section 206 tapers in the direction of arrow 459. As depicted, radius 457 reduces in the direction of arrow 459. With the reduction in radius 457 in the direction of arrow 459, angled ends 402 of bases 300 have number of angles 420 that increase in the direction of arrow 449 in a manner to cause first flexible track 236 and second flexible track 238 to be substantially perpendicular to surface 401 as radius 457 decreases. In other words, as radius 457 decreases, angles 420 for bases 300 increases. In other words, angles 420 change as radius 457 changes.

Figure 5:
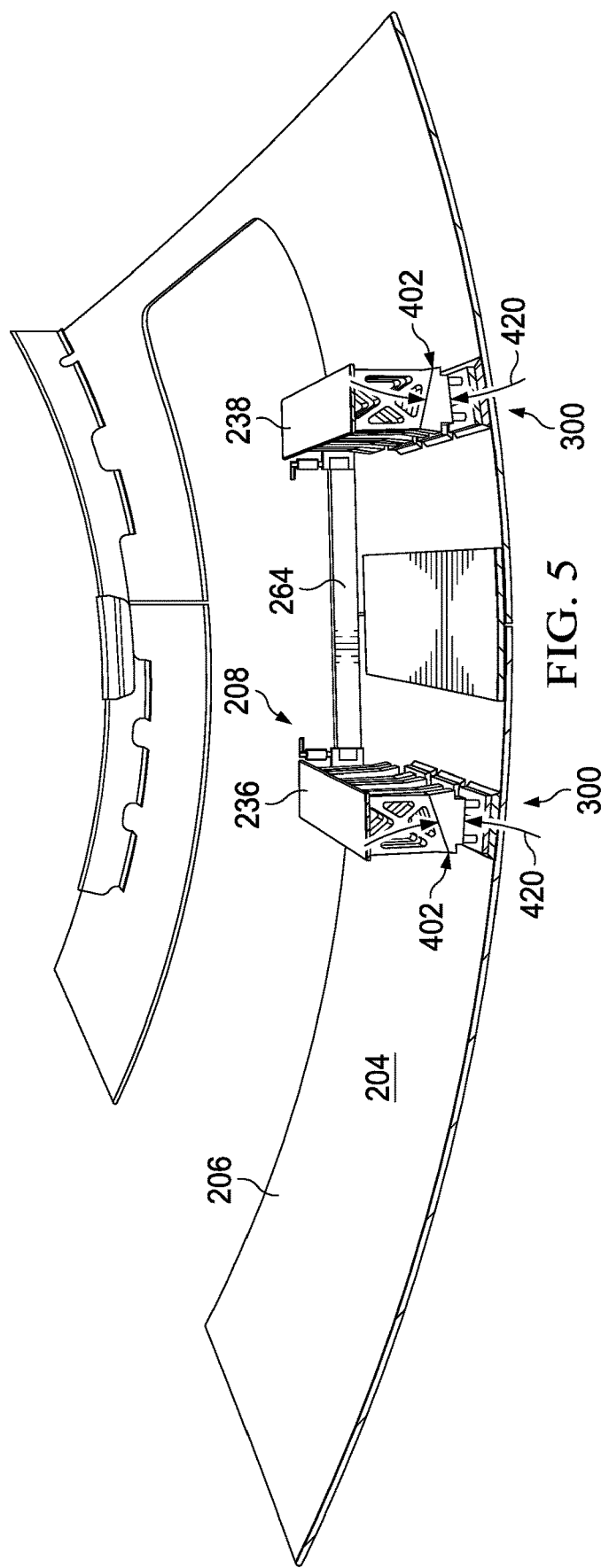
FIG. 5 is an illustration of a cross-sectional view of a vacuum track manufacturing system attached to a fuselage section in accordance with an illustrative embodiment.

With reference next to FIG. 5, an illustration of a cross-sectional view of vacuum track manufacturing system 202 attached to fuselage section 206, both shown in FIG. 2, is depicted in accordance with an illustrative embodiment. As depicted, a cross-sectional view of vacuum track manufacturing system 202 attached to fuselage section 206 is shown taken along lines 5-5 in FIG. 2.

In this cross-sectional view, angled ends 402 for bases 300 have number of angles 420 that are greater than number of angles 420 for angled ends 402 in the cross-sectional view seen in FIG. 4.

Figure 6:
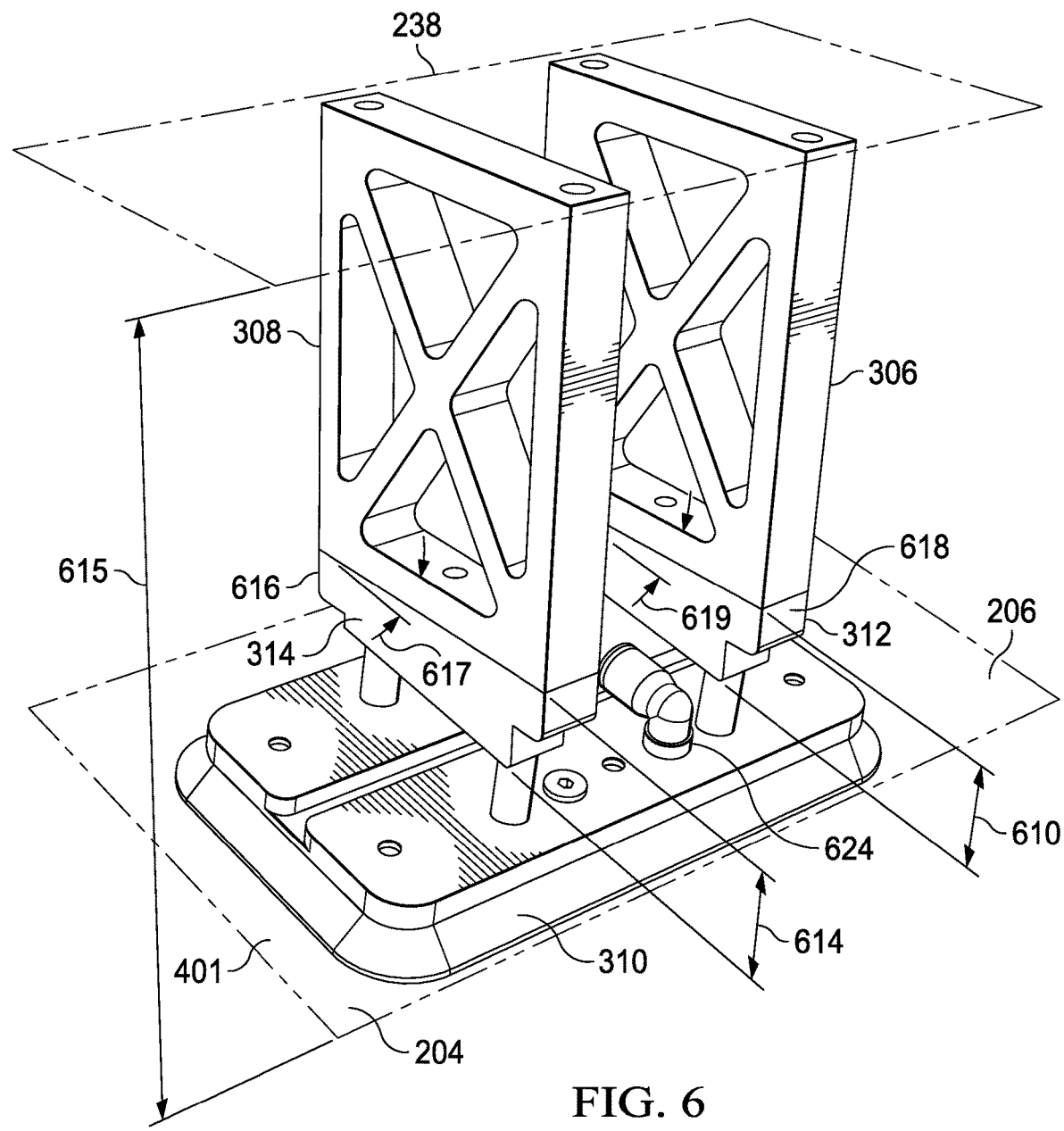
FIG. 6 is an illustration of components in a flexible track system in accordance with an illustrative embodiment.

With reference next to FIG. 6, an illustration of components in flexible track system 208 in FIG. 2 is depicted in accordance with an illustrative embodiment. In this illustrative example, an enlarged view of components in area 305 in flexible track system 208 taken in the direction of lines 6-6 is shown.

In this view, base 312 has height 610 and angled end 618. Base 314 has height 614 and angled end 616. Height 610 and height 614 are selected to maintain desired distance 615 between second flexible track 238 and surface 401 of inner mold line side 204 for fuselage section 206.

Additionally, angled end 616 on base 314 can have angle 617 in number of angles 420 and angled end 618 on base 312 can have angle 619 in number of angles 420 that is selected to maintain a desired angle for second flexible track 238. In this view, vacuum generator 624 is present. Each vacuum cup unit in vacuum cup system 240 in FIG. 2 has a vacuum generator for redundancy in the depicted examples.

Figure 7:
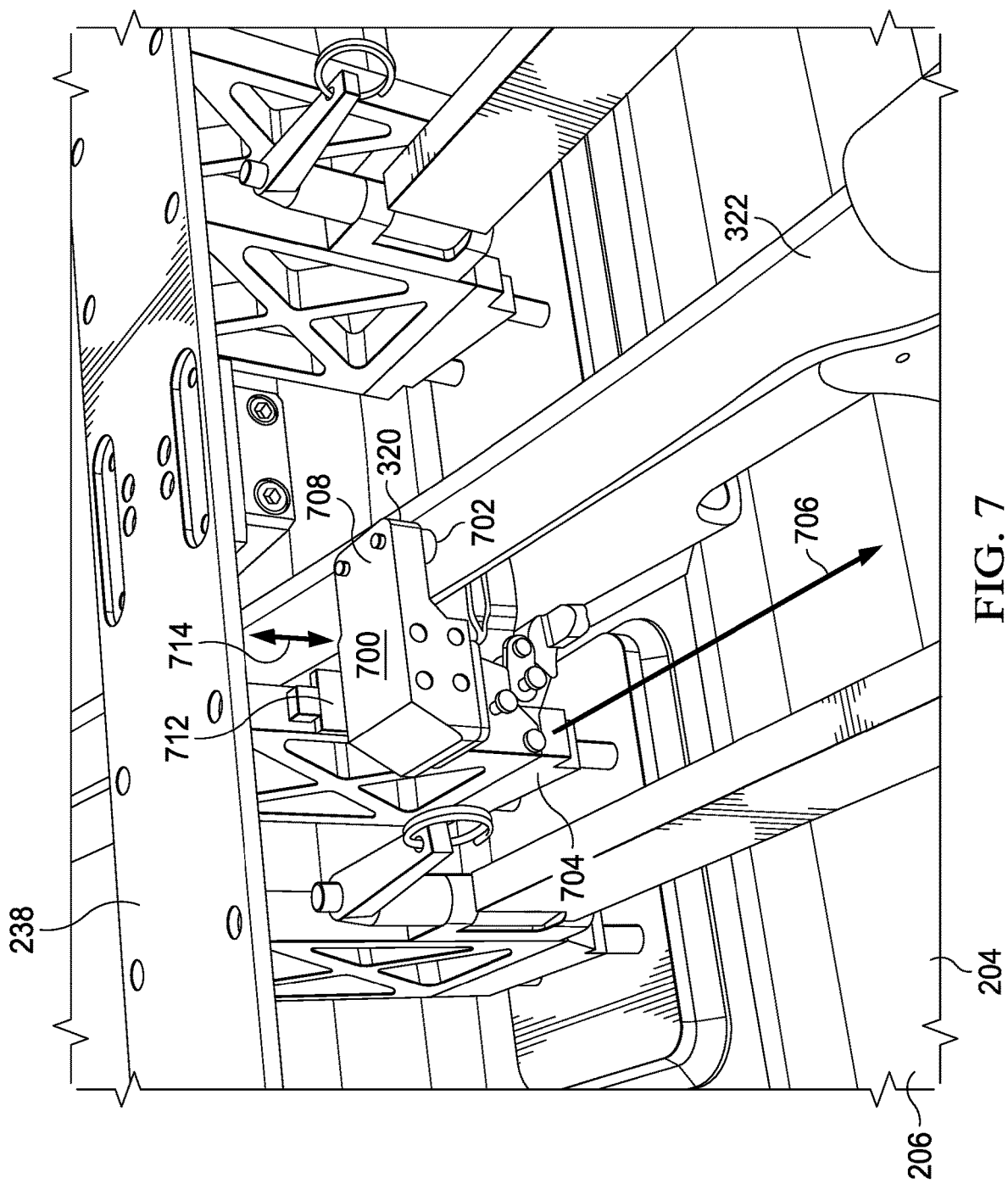
FIG. 7 is an illustration of an enlarged view of a track clamp in accordance with an illustrative embodiment.

Turning next to FIG. 7, an illustration of an enlarged view of track clamp 320 in FIG. 3 is depicted in accordance with an illustrative embodiment. In this figure, an enlarged view of track clamp in area 307 is seen in the direction of lines 7-7 in FIG. 3.

In this view, track clamp 320 has first clamping structure 700 that engages frame 322 with contact feet 702. In this illustrative example, contact feet 702 can comprise urethane, rubber, or some other suitable type of material. The material can be selected as one that reduces the possibility of causing inconsistencies on frame 322. In this illustrative example, second clamping structure 704 can rotate about axis 706 to engage frame 322.

In this illustrative example, track clamp 320 is connected to frame 322 by linear rail 712. As depicted, linear rail 712 is configured to reduce or prevent constraining second flexible track 238. In this illustrative example, linear rail 712 allows for fine adjustments in the direction of arrow 714.

The illustration of vacuum track manufacturing system 202 and the different components in FIGS. 2-7 have been presented as an illustration for one manner in which vacuum track manufacturing system 106 shown in block form in FIG. 1 can be implemented. This illustration is not meant to limit the manner in which other illustrative examples can be implemented.

For example, the illustration of angled end 616 on base 314 shown in FIG. 6 and angled end 618 on base 312 shown in FIG. 6 is an example of one manner in which number of angles 420 can be set for a flexible track, such as second flexible track 238. This angle can also be set using other mechanisms in other illustrative examples. As another example, flexible track system 208 can be used with splice 455 and can take other forms other than a butt splice. For example, splice 455 may be a lap splice, a bevel splice, a half lap splice, or some other suitable type of splice.

Figure 8:
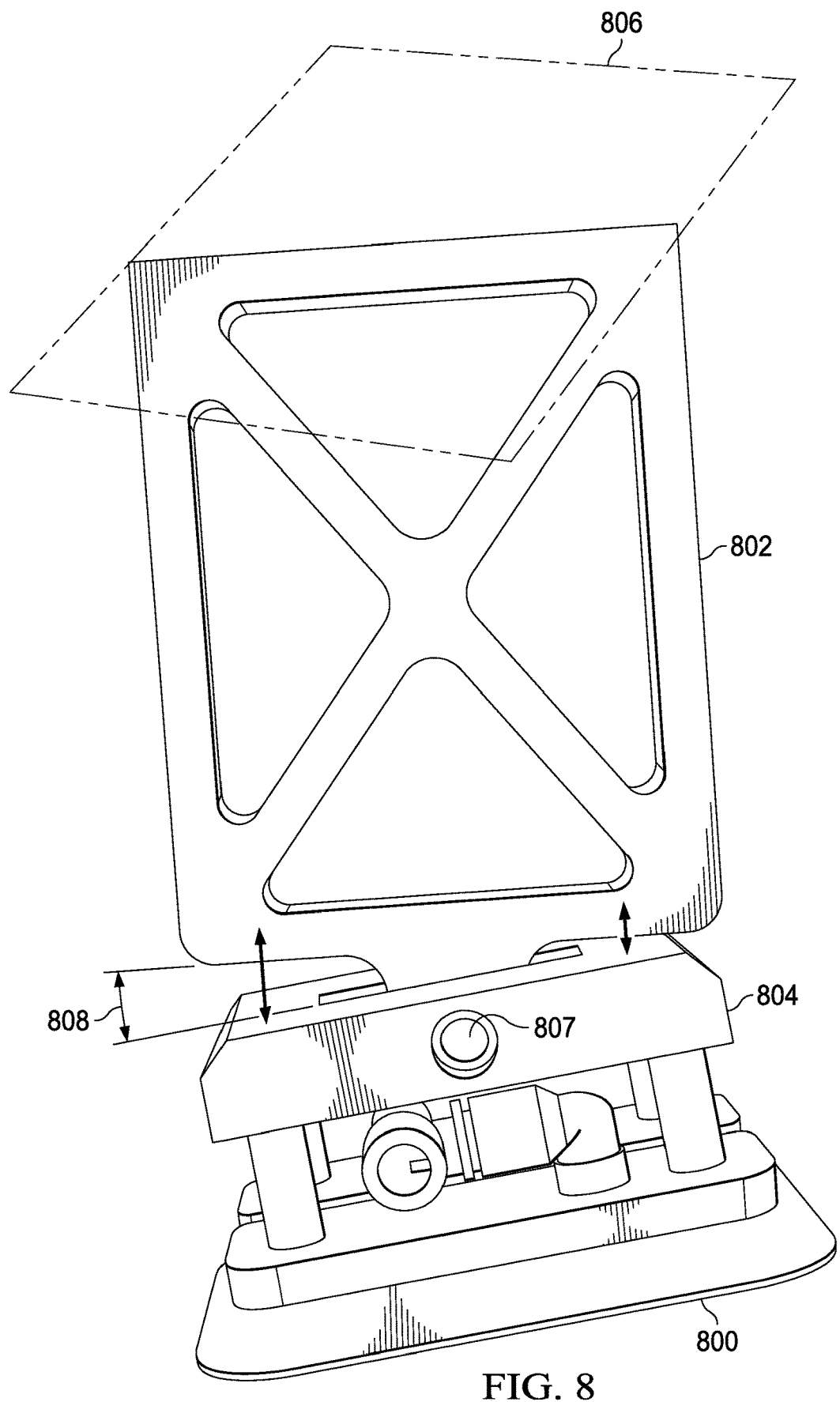
FIG. 8 is an illustration of another mechanism for setting an angle for a flexible track in accordance with an illustrative embodiment.

In FIG. 8, an illustration of another mechanism for setting an angle for a flexible track is depicted in accordance with an illustrative embodiment. As depicted, vacuum cup unit 800, frame 802, base 804, and flexible track 806 are examples are components in one physical implementation of flexible track system 115 shown in block form in FIG. 1. In this particular example, angle 808 is set for flexible track 806 by frame 802 which is rotatably connected to base 804, which is connected to vacuum cup unit 800. In other words, frame 802 can be rotated about axis 807 to set angle 808 for flexible track 806.

As depicted, vacuum cup unit 800 is an example of an implementation for a vacuum cup unit in vacuum cup units 117 in FIG. 1. Frame 802 is an example of an implementation of a frame in frames 126 shown in block form in FIG. 1. Base 804 is an example of an implementation for a base in bases 124 shown in block form in FIG. 1.

Figure 9:
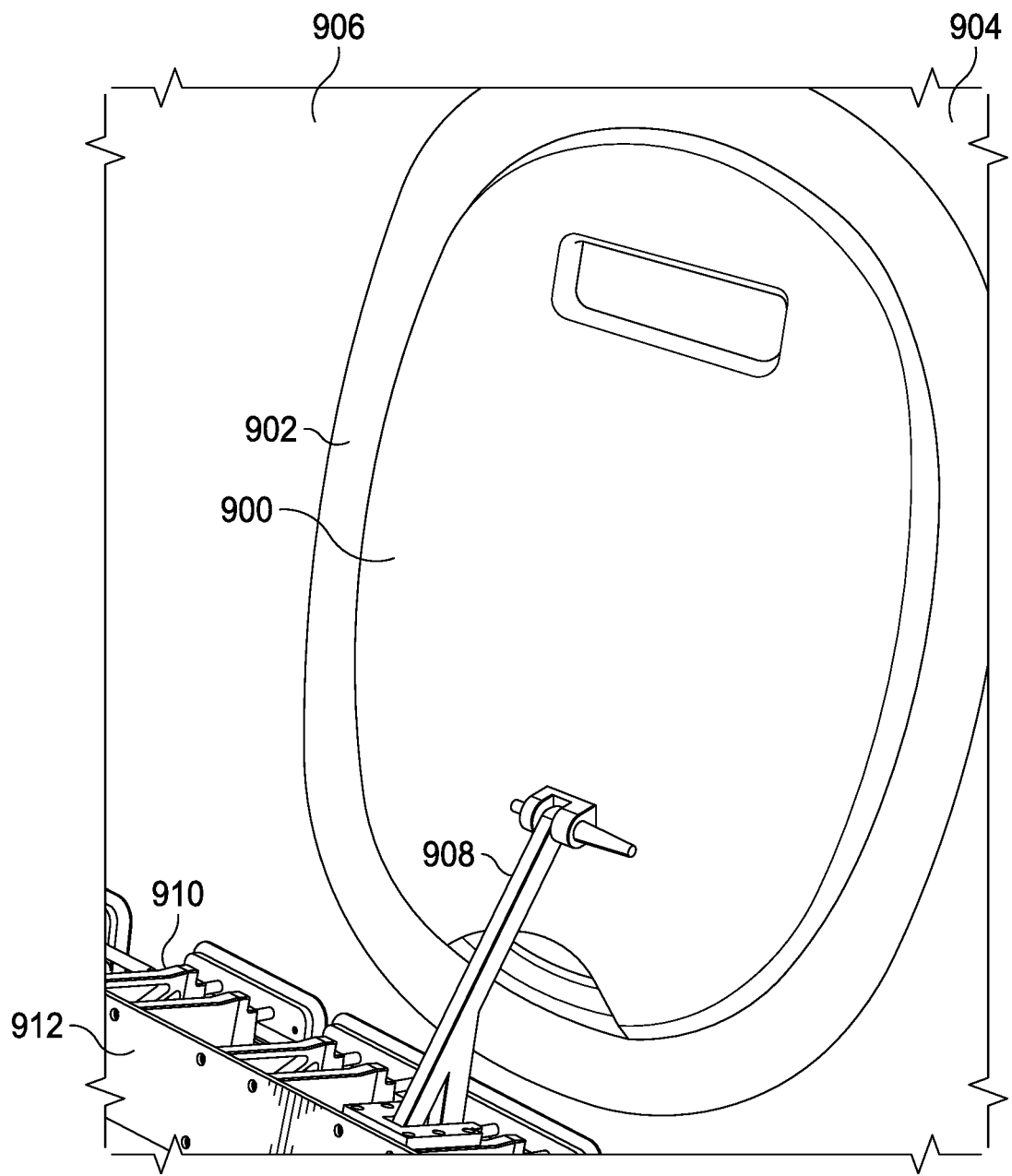
FIG. 9 is an illustration of an implementation for a positioning system in accordance with an illustrative embodiment.

As another illustrative example, FIG. 9 is an illustration of an implementation for a positioning system in accordance with an illustrative embodiment. In this illustrative example, window plug 900 is an example of another implementation of a window plug in window plugs 150 shown in block form in FIG. 1. Window plug 900 is an example of an additional implementation in addition to window plug 622 in FIG. 6.

In this example, window plug 900 is installed in window opening 902 of inner mold line 904 of fuselage section 906. In this depicted example, link 908 connects window plug 900 to frame 910 for flexible track 912.

Figure 10:
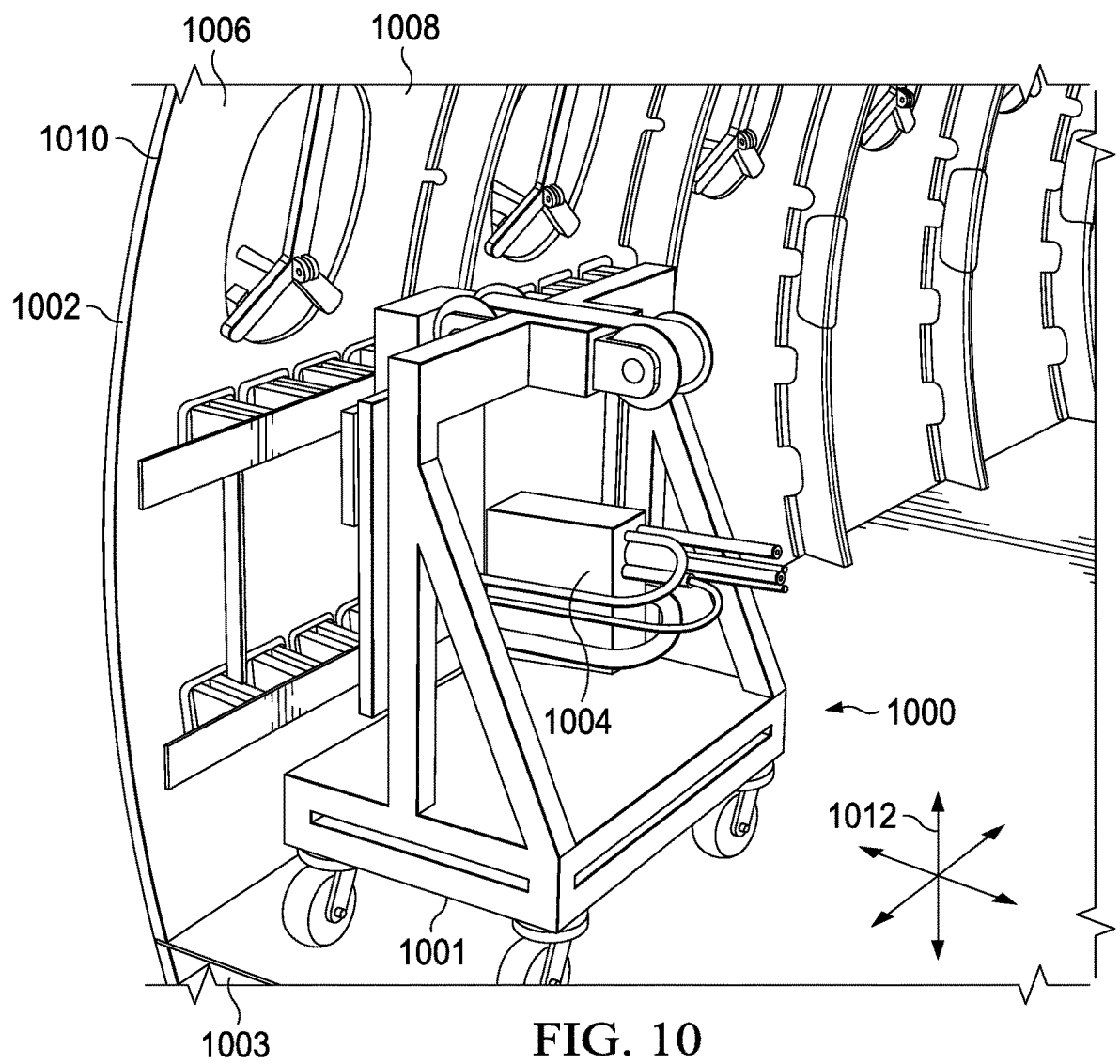
FIG. 10 is an illustration of a support system for positioning a portion of a flexible track system and a crawler robot in accordance with an illustrative embodiment.

With reference now to FIG. 10, an illustration of a support system for positioning a portion of a flexible track system and a crawler robot is depicted in accordance with an illustrative embodiment. In this illustrative example, support system 1000 comprises mobile cart 1001. Mobile cart 1001 holds first section 1002 of flexible track system 1003 and crawler robot 1004. Mobile cart 1001 can move these components about axes 1012.

In this illustrative example, support system 1000 has placed first section 1002 and crawler robot 1004 onto surface 1006 on inner mold line side 1008 of fuselage section 1010. After placement of first section 1002 of flexible track system 1003, additional sections (not shown) of flexible track system 1003 can be positioned and connected to first section 1002 to assemble flexible track system 1003.

The illustration of support system 1000 in FIG. 10 is provided as an example of one implementation for support system 166 shown in block form in FIG. 1. This illustration is not meant to limit the manner in which other illustrative examples can be implemented. For example, support system 166 can take the form of a mobile robotic arm (not shown), a crane (not shown) for outer mold line attachments, or other suitable platforms instead of mobile cart 1010.

Figure 11:
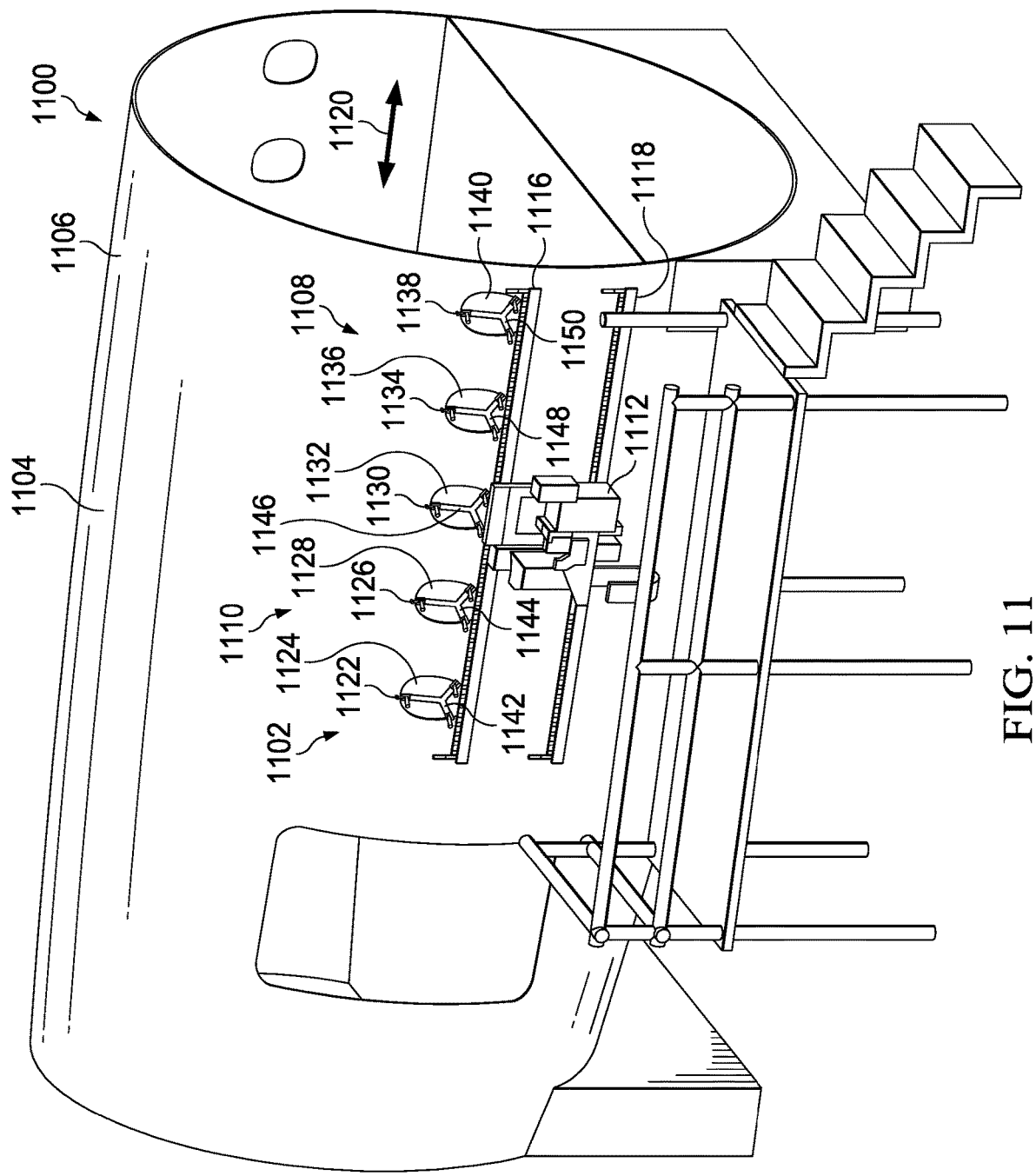
FIG. 11 is an illustration of a manufacturing environment in accordance with an illustrative embodiment.

With Reference now to FIG. 11, an illustration of a manufacturing environment is depicted in accordance with an illustrative embodiment. In this illustrative example, manufacturing environment 1100 is an example of another implementation for manufacturing environment 100 shown in block form in FIG. 1. As depicted, vacuum track manufacturing system 1102 is attached to outer mold line side 1104 for fuselage section 1106.

Vacuum track manufacturing system 1102 comprises a number of different components. As depicted, vacuum track manufacturing system 1102 comprises flexible track system 1108, positioning system 1110, and crawler robot 1112.

Flexible track system 1108 is attached to outer mold line side 1104 of fuselage section 1106. Crawler robot 1112 is attached to first flexible track 1116 and second flexible track 1118 in flexible track system 1108. Crawler robot 1112 can move in the direction of arrow 1120 along flexible track system 1108 and perform manufacturing operations on outer mold line side 1104 of fuselage section 1106.

In this illustrative example, positioning system 1110 comprises window plug 1122 connected to window opening 1124, window plug 1126 connected to window opening 1128, window plug 1130 connected to window opening 1132, window plug 1134 connected to window opening 1136, window plug 1138 connected to window opening 1140. Window plug 1122 is connected to flexible track system 1108 by cable 1142, window plug 1126 is connected to flexible track system 1108 by cable 1144, window plug 1130 is connected to flexible track system 1108 by cable 1146, window plug 1134 is connected to flexible track system 1108 by cable 1148, and window plug 1138 is connected to flexible track system 1108 by cable 1150.

As depicted in this example, positioning system 1110 enables placing flexible track system 1108 in a desired position on outer mold line side 1104 of fuselage section 1106. Further, positioning system 1110 also provides support in the event that flexible track system 1108 fails to maintain attachment to fuselage section 1106.

Figure 12:
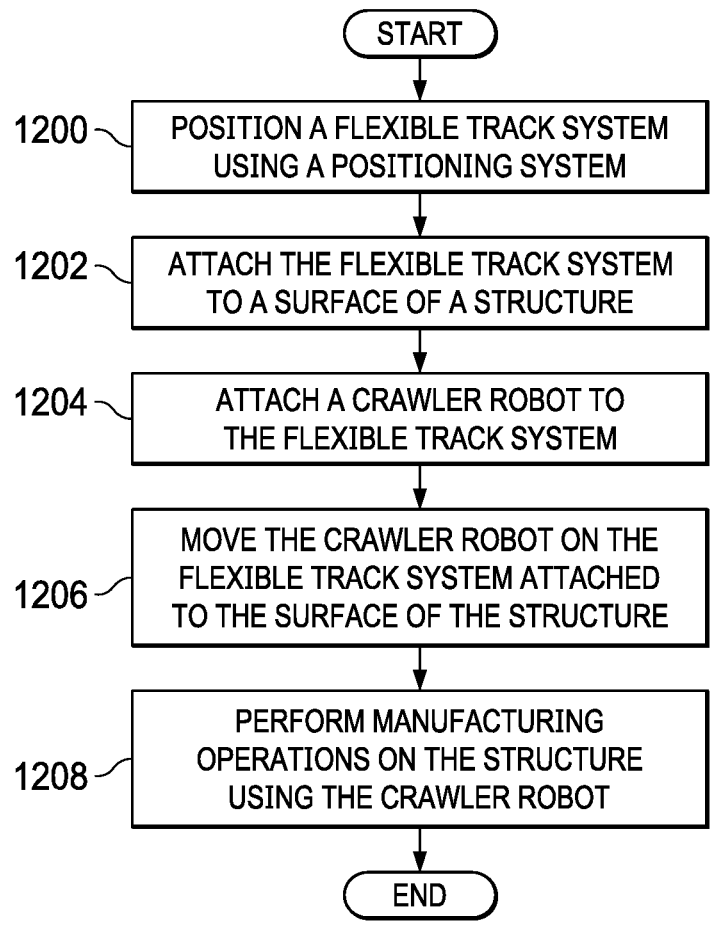
FIG. 12 is an illustration of a flowchart of a process for moving a crawler robot in a surface of a structure in accordance with an illustrative embodiment.

Turning next to FIG. 12, an illustration of a flowchart of a process for moving a crawler robot in a surface of a structure is depicted in accordance with an illustrative embodiment. The process illustrated in FIG. 12 can be implemented in manufacturing environment 100 in FIG. 1. For example, the process can be implemented using flexible track system 115 in vacuum track manufacturing system 106 to enable crawler robot 164 to have at least one of desired distance 118 or angle 132 with respect to surface 120 of structure 102 to perform manufacturing operations 108.

For example, the process can be used with an implementation of vacuum track manufacturing system 106, shown in block form in FIG. 1, such as vacuum track manufacturing system 202 attached to inner mold line side 204 for fuselage section 206 in FIG. 2 or vacuum track manufacturing system 1102 attached to outer mold line side 1104 for fuselage section 1106 in FIG. 11. The process begins by positioning flexible track system 115 using positioning system 142 (operation 1200). In operation 1200, positioning system 142 extends from variable height base system 114 and is configured to connect to a group of features 144 for structure 102 to position flexible track system 115 in desired position 146 on structure 102 for crawler robot 164 to properly perform manufacturing operations 108.

The process attaches flexible track system 115 to surface 120 of structure 102 (operation 1202). Flexible track system 115 comprises flexible tracks 110, vacuum cup system 112, and variable height base system 114. Variable height base system 114 connects vacuum cup system 112 and flexible tracks 110 to each other. In operation 1200, variable height base system 114 has heights 116 selected to maintain desired distance 118 between flexible tracks 110 and surface 120 of structure 102 to which vacuum cup system 112 is attached.

For example, flexible tracks 110 can be connected to surface 120 of structure 102 in which surface 120 can be located on inner mold line side 204 for fuselage section 206. In another example, flexible tracks 110 can be connected to surface 120 of structure 102 in which surface 120 can be located on outer mold line side 177 in fuselage section 1106 in FIG. 11.

The process attaches crawler robot 164 to flexible track system 115 (operation 1204). The attachment of crawler robot 164 to flexible track system 115 can be performed by human operators. In another example, crawler robot 164 is positioned on flexible tracks 110 using a support system as an implementation of operation 1204. Support system 166 can be used by the human operators or controlled by controller 190, or a combination of both. In another illustrative example, support system 166 can be an automated system that is configured to move and attach crawler robot 164 to flexible tracks 110.

Crawler robot 164 moves on flexible track system 115 attached to surface 120 of structure 102 (operation 1206). The process performs manufacturing operations 108 on structure 102 using crawler robot 164 (operation 1208). The process terminates thereafter. In the illustrative example, crawler robot 164 properly performs manufacturing operations 108 when crawler robot 164 has desired distance 118 from surface 120 of structure 102. When desired distance 118 is not present, crawler robot 164 is unable to perform manufacturing operations 108. For example, crawler robot 164 may utilize tools that require a specific distance for proper operation. When desired distance 118 is absent, the tools are unable to operate properly. For example, if crawler robot 164 is at a distance greater than desired distance 118, crawler robot 164 may be unable to install a collar or a nut on a bolt. In this example, desired distance 118 translates to locating flexible tracks 110 at a location relative to surface 120 of structure 102, splice 101, or both in a manner that permits crawler robot 164 to operate properly. This feature aids in establishing the height of flexible tracks 110, the width of flexible tracks 110, and the distance of flexible tracks 110 from surface 120 of structure 102, splice 101, or both.

In operation 1206, For example, angles 122 may be selected such that first flexible track 156 and second flexible track 158 match contour 128 of surface 120 such that first flexible track 156 and second flexible track 158 are substantially perpendicular to surface 120 on inner mold line side 171 of structure 102. Crawler robot 164 may require being substantially perpendicular to surface 120 to properly perform manufacturing operations 108. For example, crawler robot 164 may have a collar installation tool that requires the tool to be substantially perpendicular with surface 120 to properly install a collar on a bolt.

Figure 13:
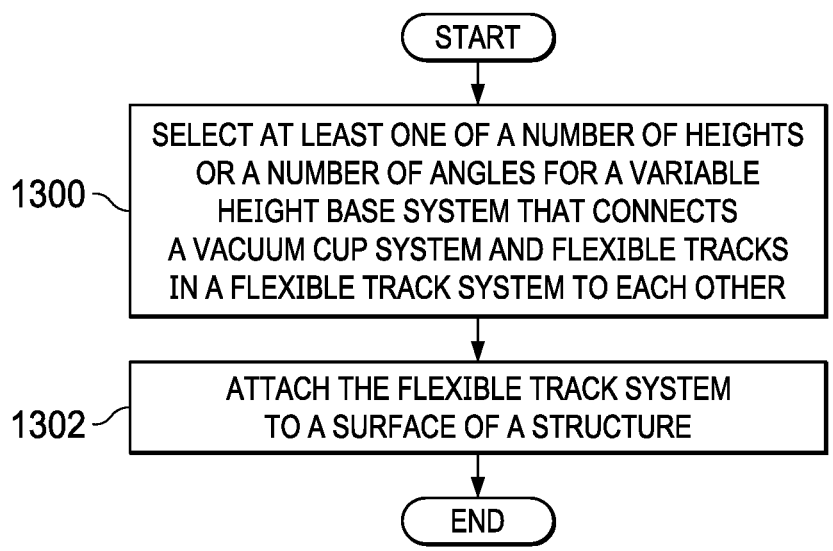
FIG. 13 is an illustration of a flowchart of a process for installing a flexible track system in accordance with an illustrative embodiment.

Turning to FIG. 13, an illustration of a flowchart of a process for installing a flexible track system is depicted in accordance with an illustrative embodiment. The process illustrated in FIG. 13 can be implemented in manufacturing environment 100 to install flexible track system 115 to surface 120 of structure 102 to perform manufacturing operations 108 on structure 102 in FIG. 1.

The process begins by selecting at least one of a number of heights 116 or a number of angles 122 for variable height base system 114 that connects vacuum cup system 112 and flexible tracks 110 in flexible track system 115 to each other (operation 1300). In operation 1300, at least one of the number of heights 116 or the number of angles 122 for variable height base system 114 maintains at least one of desired distance 118 between flexible tracks 110 and surface 120 of structure 102 to which vacuum cup system 112 is attached or causes flexible tracks 110 in flexible track system 115 to match contour 128 of surface 120 of structure 102. Further, a configuration of at least one of variable height base system 114 or vacuum cup system 112 enables flexible tracks 110 to bridge structural frames 197 on surface 120 of structure 102.

The process attaches flexible track system 115 to surface 120 of structure 102 (operation 1302). The process terminates thereafter.

In determining where to place flexible track system 115 relative to splice 101, first flexible track 156 and second flexible track 158 in flexible tracks 110 are placed parallel to splice 101, which can be defined by link pins 152 for window plugs 150. The placement of first flexible track 156 and second flexible track 158 in flexible tracks 110 can be made such that a splice plate, butt splice, or other splicing feature in splice 101 are between flexible tracks 110.

The thickness of splice 101 can be accommodated by Z-axis travel, stroke, or both, from a tool on crawler robot 164. Heights 116 of variable height base system 114 affects the center of gravity of flexible track system 115 when used in inner mold line side 171. Reducing heights 116 of variable height base system 114 is desirable to reduce the center of gravity of flexible track system 115 such that a moment acting on vacuum cup units 117 is reduced. As depicted, reducing heights 116 results in a reduction in system overhang and moments acting on vacuum cup units 117 in vacuum cup system 112. As a result, the deflection of flexible track system 115 can be reduced resulting in increased accuracy in positioning tools use by crawler robot 164.

Figure 14A:
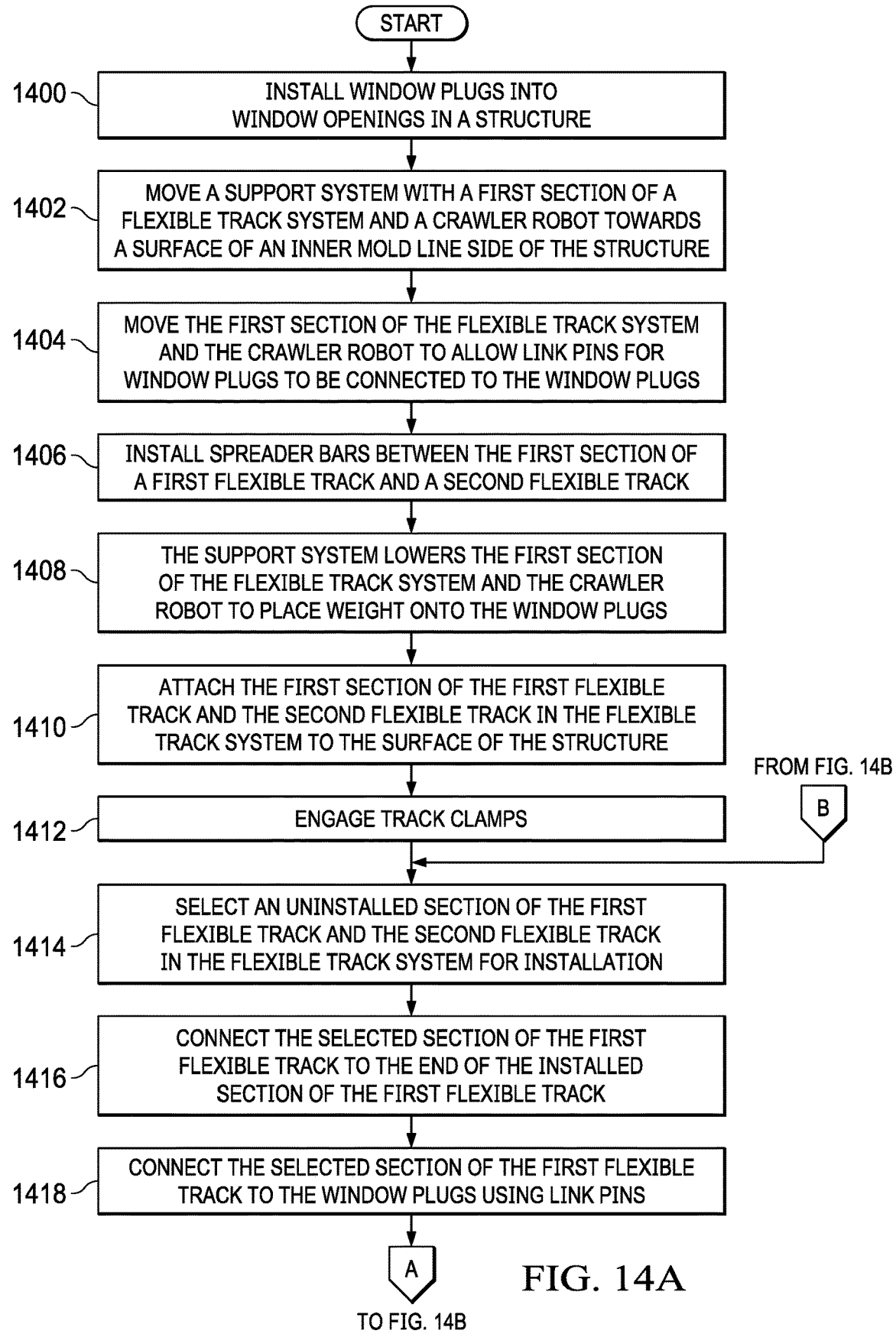
FIGS. 14A and 14B are illustrations of a flowchart of a process for deploying a vacuum track manufacturing system in accordance with an illustrative embodiment.
Figure 14B:
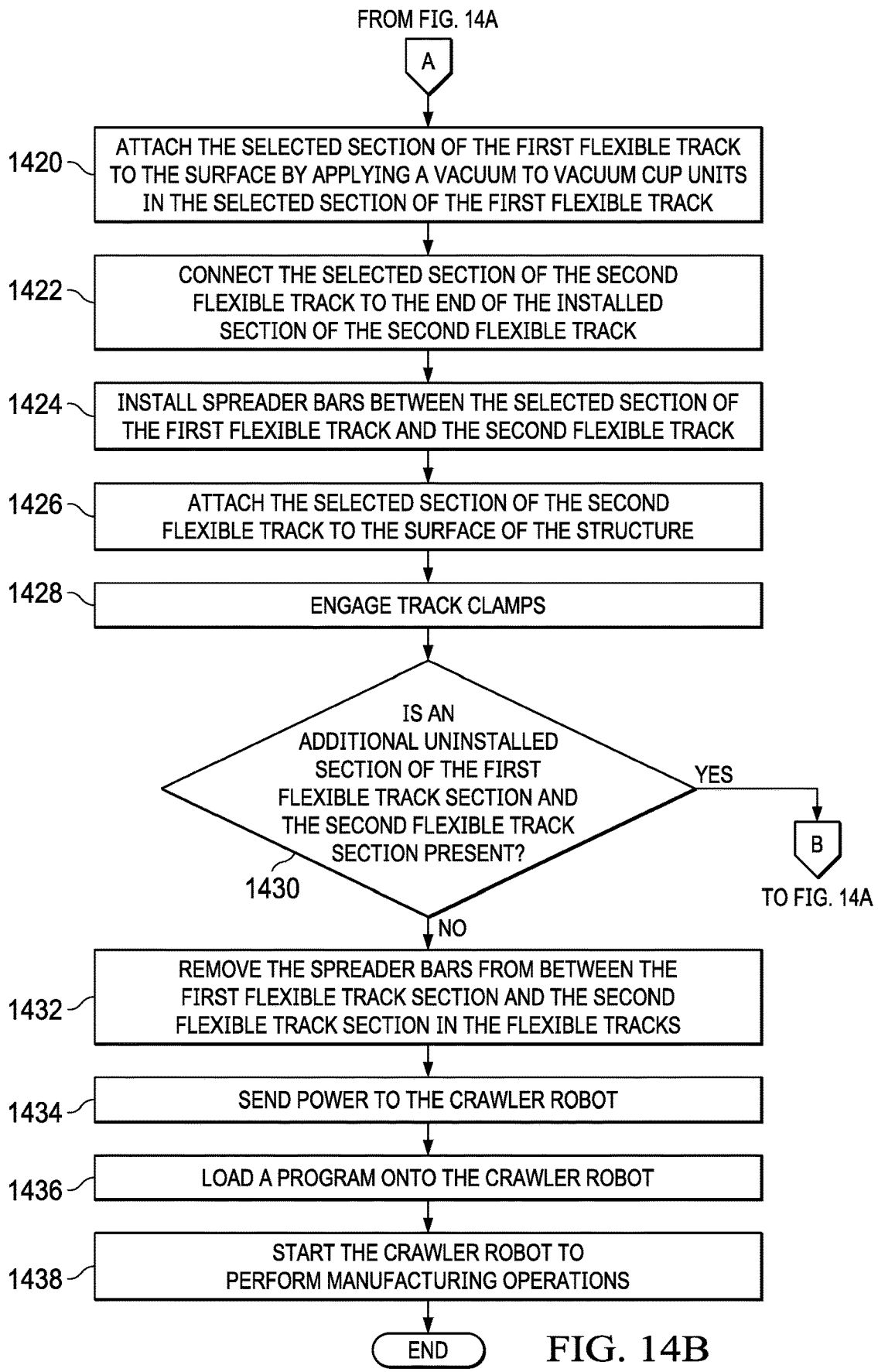

With reference next to FIGS. 14A and 14B, illustrations of a flowchart of a process for deploying a vacuum track manufacturing system are depicted in accordance with an illustrative embodiment. The process illustrated in FIGS. 14A and 14B can be implemented in manufacturing environment 100 to deploy vacuum track manufacturing system 106 onto structure 102 for object 104 in FIG. 1.

The process beings by installing window plugs 150 into window openings 148 in structure 102 (operation 1400). In this example, structure 102 can be a fuselage section for object 104 such as an aircraft. Further other mechanism can be used in addition to or in place of window plugs 150 placed into window openings 148. For example, fasteners can be placed into temporary holes formed specifically for positioning flexible track system 115, open holes in structure 102, and other structural features to which a fastening system can be used to attach flexible track system 115 in desired position 146 on structure 102.

The process moves support system 166 with a first section of flexible track system 115 and crawler robot 164 towards surface 120 of inner mold line side of structure 102 (operation 1402). In this example, support system 166 can be mobile cart 1001 in FIG. 10.

The process moves the first section of flexible track system 115 and crawler robot 164 to allow link pins 152 for window plugs 150 to be connected to window plugs 150 (operation 1404). In operation 1404, link pins 152 are connected to flexible track system 115 before connecting link pins 152 to window plugs 150. In other examples, link pins 152 can be pre-connected to window plugs 150 and then connected to flexible track system 115.

The process installs spreader bars 160 between the first section of first flexible track 156 and second flexible track 158 (operation 1406). In one illustrative example, installing spreader bars 160 between first flexible track 156 and second flexible track 158 in flexible tracks 110 results in spreader bars 160 bridging splice 101 between first flexible track 156 and second flexible track 158. The support system 166 lowers the first section of flexible track system 115 and crawler robot 164 to place weight onto window plugs 150 (operation 1408).

The process attaches first section of first flexible track 156 and second flexible track 158 in flexible track system 115 to surface 120 of structure 102 (operation 1410). In operation 1410, a vacuum is applied by vacuum cup units 117 to attach the first section of first flexible track 156 and second flexible track 158 to surface 120 of structure 102. The process then engages track clamps (operation 1412). In operation 1412, track clamps can be implemented using track clamp 320.

The process selects an uninstalled section of first flexible track 156 and second flexible track 158 in flexible track system 115 for installation (operation 1414). The process connects the selected section of first flexible track 156 to the end of the installed section of first flexible track 156 (operation 1416). The process connects the selected section of first flexible track 156 to window plugs 150 using link pins 152 (operation 1418). The process attaches the selected section of first flexible track 156 to surface 120 by applying a vacuum to vacuum cup units 117 in selected section of first flexible track 156 (operation 1420).

Next, the process connects the selected section of second flexible track 158 to the end of the installed section of second flexible track 158 (operation 1422). The process installs spreader bars 160 between the selected section of first flexible track 156 and second flexible track 158 (operation 1424). Spreader bars 160 may be removed from the installed section of the first section of first flexible track 156 and second flexible track 158 and used in operation 1420. In other examples, spreader bars 160 may be left in place.

Thereafter, the process attaches the selected section of the second flexible track 158 to surface 120 of structure 102 (operation 1426). The process then engages track clamps (operation 1428).

A determination is made as to whether an additional uninstalled section of first flexible track 156 and section of second flexible track 158 is present (operation 1430). If an additional uninstalled section of first flexible track 156 and section of second flexible track 158 is present, the process returns to operation 1414.

Otherwise, the process removes spreader bars 160 from between section of first flexible track 156 and section of second flexible track 158 in flexible tracks 110 (operation 1432). The process then sends power to crawler robot 164 (operation 1434). Next, the process loads a program onto crawler robot 164 (operation 1436), wherein crawler robot 164 begins to perform manufacturing operations 108 (operation 1438). The process terminates thereafter.

In performing manufacturing operations 108 in operation 1438, crawler robot 164 can perform at least one of inspection and installing nuts or collars on pins in fastener systems 173 inserted from outer mold line side 177 towards inner mold line side 171.

In this illustrative example, crawler robot 164 on inner mold line side 171 of structure 102 follows additional crawler robot 182 operating on outer mold line side 177 of structure 102. Crawler robot 164 can be a slave or may operate independently to additional crawler robot 182.

Figure 15:
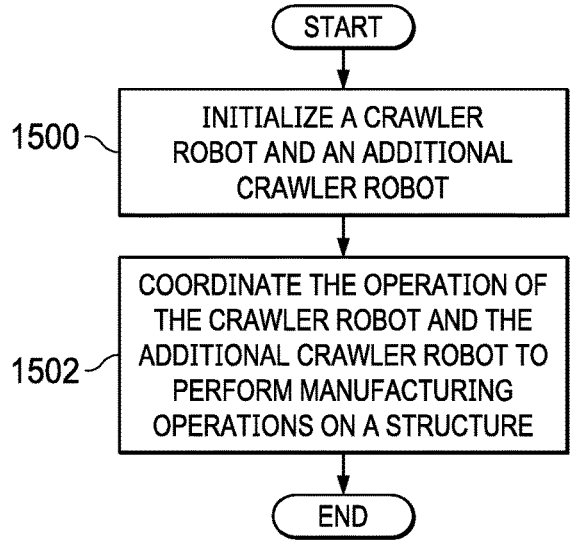
FIG. 15 is an illustration of a flowchart of a process for forming manufacturing operations in accordance with an illustrative embodiment.

With reference now to FIG. 15, an illustration of a flowchart of a process for forming manufacturing operations is depicted in accordance with an illustrative embodiment. The process illustrated in FIG. 15 can be implemented in manufacturing environment 100 in FIG. 1. The different operations can be implemented using controller 190 running on computer system 192. The different operations can occur in response to controller 190 processing program 194 in FIG. 1.

The process begins by initializing crawler robot 164 additional crawler robot 182 (operation 1500). In operation 1500, the crawler robots are turned on to perform manufacturing operations 108. The process coordinates the operation of crawler robot 164 and additional crawler robot 182 to perform manufacturing operations 108 on structure 102 (operation 1502). The process terminates thereafter.

For example, the coordination of crawler robot 164 and additional crawler robot 182 can occur to install fastener systems 173. For example, additional crawler robot 182 on outer mold line side 177 of structure 102 inserts pins for fastener systems 173 while crawler robot 164 on inner mold line side 171 of structure 102 installs collars on the pins inserted by additional crawler robot 182.

The flowcharts and block diagrams in the different depicted embodiments illustrate the architecture, functionality, and operation of some possible implementations of apparatuses and methods in an illustrative embodiment. In this regard, each block in the flowcharts or block diagrams can represent at least one of a module, a segment, a function, or a portion of an operation or step. For example, one or more of the blocks can be implemented as program code, hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams may be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

Figure 16:
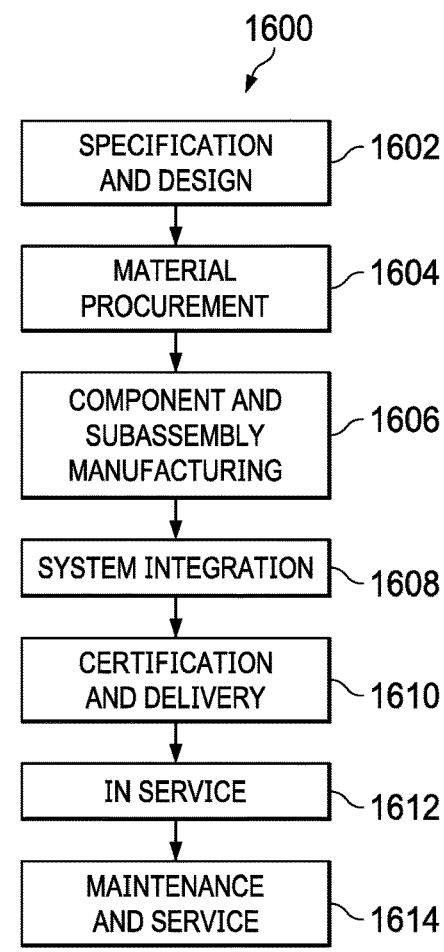
FIG. 16 is an illustration of a block diagram of an aircraft manufacturing and service method in accordance with an illustrative embodiment.
Figure 17:
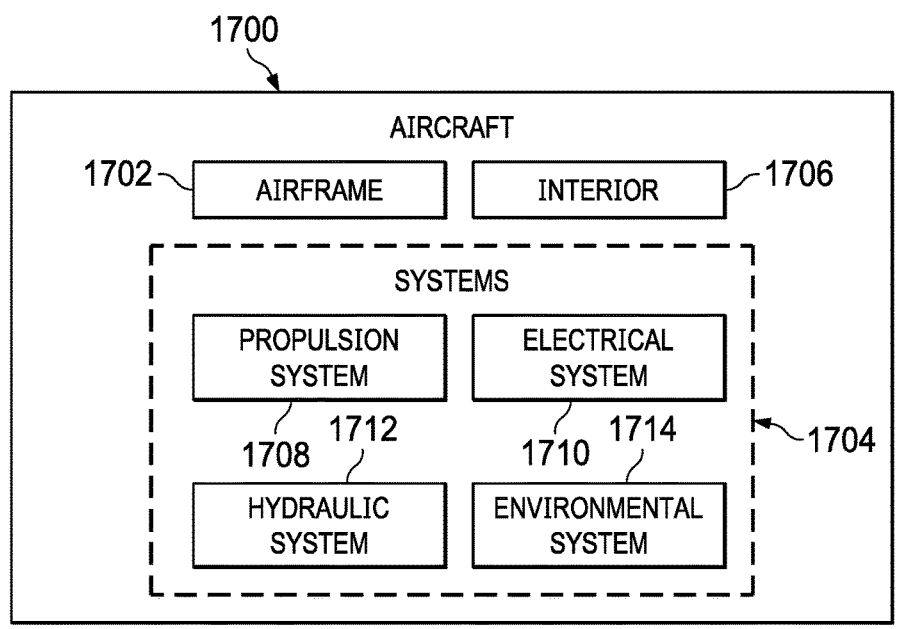
FIG. 17 is an illustration of a block diagram of an aircraft in which an illustrative embodiment may be implemented.

Illustrative embodiments of the disclosure may be described in the context of aircraft manufacturing and service method 1600 as shown in FIG. 16 and aircraft 1700 as shown in FIG. 17. Turning first to FIG. 16, an illustration of a block diagram of an aircraft manufacturing and service method is depicted in accordance with an illustrative embodiment. During pre-production, aircraft manufacturing and service method 1600 may include specification and design 1602 of aircraft 1700 in FIG. 17 and material procurement 1604.

During production, component and subassembly manufacturing 1606 and system integration 1608 of aircraft 1700 in FIG. 17 takes place. Thereafter, aircraft 1700 in FIG. 17 may go through certification and delivery 1610 in order to be placed in service 1612. While in service 1612 by a customer, aircraft 1700 in FIG. 17 is scheduled for routine maintenance and service 1614, which may include modification, reconfiguration, refurbishment, and other maintenance or service.

Each of the processes of aircraft manufacturing and service method 1600 may be performed or carried out by a system integrator, a third party, an operator, or some combination thereof. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 17, an illustration of a block diagram of an aircraft is depicted in which an illustrative embodiment may be implemented. In this example, aircraft 1700 is produced by aircraft manufacturing and service method 1600 in FIG. 16 and may include airframe 1702 with plurality of systems 1704 and interior 1706. Examples of systems 1704 include one or more of propulsion system 1708, electrical system 1710, hydraulic system 1712, and environmental system 1714. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 1600 in FIG. 16. In the illustrative example, vacuum track manufacturing system 106 in the different processes described using this system can be used to perform manufacturing operations on aircraft 1700. For example, flexible track system 115 in vacuum track manufacturing system 106 can be attached to the surface of a structure for aircraft 1700 for use by crawler robot 164 to perform manufacturing operations 108.

For example, flexible track system 115 can provide at least one of the desired distance 118 or angle 132 with respect to surface 120 of structure 102 such as a fuselage section of airframe 1702 of aircraft 1700. For example, flexible track system 115 with crawler robot 164 in vacuum track manufacturing system 106 can be employed to perform manufacturing operations 108 such as drilling holes or installing fasteners in the fuselage section for airframe 1702.

In one illustrative example, components or subassemblies produced in component and subassembly manufacturing 1606 in FIG. 16 may be fabricated or manufactured in a manner similar to components or subassemblies produced while aircraft 1700 is in service 1612 in FIG. 16. As yet another example, one or more apparatus embodiments, method embodiments, or a combination thereof may be utilized during production stages, such as component and subassembly manufacturing 1606 and system integration 1608 in FIG. 16. One or more apparatus embodiments, method embodiments, or a combination thereof may be utilized while aircraft 1700 is in service 1612, during maintenance and service 1614 in FIG. 16, or both.

For example, vacuum track manufacturing system 106 can be used to manufacture components or subassemblies produced in component and subassembly manufacturing 1606, such as assembling fuselage sections for airframe 1702. Additionally, vacuum track manufacturing system 106 can also be used during system integration 1608. For example, inspection, drilling, fastener installation, or other operations may be performed during system integration 1608 using vacuum track manufacturing system 106.

The use of a number of the different illustrative embodiments may substantially expedite the assembly of aircraft 1700, reduce the cost of aircraft 1700, or both expedite the assembly of aircraft 1700 and reduce the cost of aircraft 1700.

For example, vacuum track manufacturing system 106 for flexible track system 208 can operate during component and subassembly manufacturing 1606 to perform manufacturing operations such as, without limitation fastened components each other to form structures or fasten components to structures. Vacuum track manufacturing system 106 also may operate during maintenance and service 1614 to perform manufacturing operations such as inspection operations, drilling operations, faster installation operations, or other manufacturing operations to form structures or fasten components to structures when performing at least one of routine maintenance and service 1614, which may include modification, reconfiguration, refurbishment, and other maintenance or service.

Figure 18:
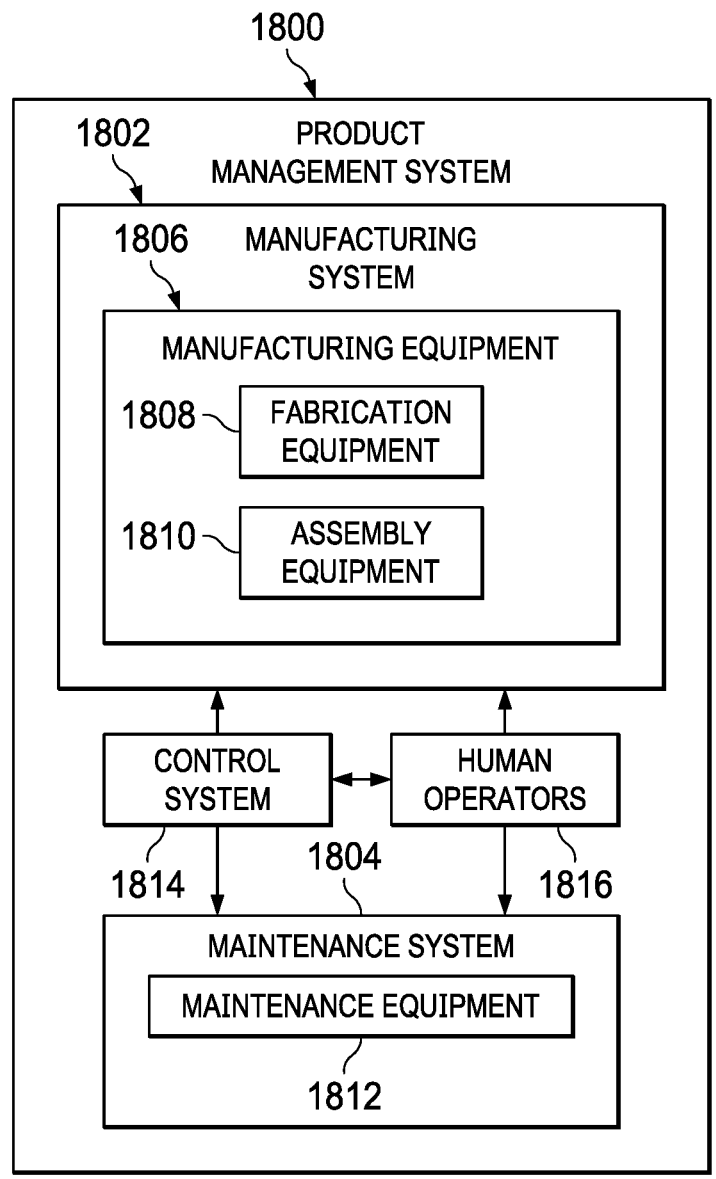
FIG. 18 is an illustration of a block diagram of a product management system in accordance with an illustrative embodiment.

Turning now to FIG. 18, an illustration of a block diagram of a product management system is depicted in accordance with an illustrative embodiment. Product management system 1800 is a physical hardware system. In this illustrative example, product management system 1800 may include at least one of manufacturing system 1802 or maintenance system 1804.

Manufacturing system 1802 is configured to manufacture products, such as aircraft 1700 in FIG. 17. As depicted, manufacturing system 1802 includes manufacturing equipment 1806. Manufacturing equipment 1806 includes at least one of fabrication equipment 1808 or assembly equipment 1810.

Fabrication equipment 1808 is equipment that may be used to fabricate components for parts used to form aircraft 1700 in FIG. 17. For example, fabrication equipment 1808 may include machines and tools. These machines and tools may be at least one of a drill, a hydraulic press, a furnace, a mold, a composite tape laying machine, a vacuum system, a lathe, or other suitable types of equipment. Fabrication equipment 1808 may be used to fabricate at least one of metal parts, composite parts, semiconductors, circuits, fasteners, ribs, skin panels, spars, antennas, or other suitable types of parts.

Assembly equipment 1810 is equipment used to assemble parts to form aircraft 1700 in FIG. 17. In particular, assembly equipment 1810 may be used to assemble components and parts to form aircraft 1700 in FIG. 17. Assembly equipment 1810 also may include machines and tools. These machines and tools may be at least one of a robotic arm, a crawler, a faster installation system, a rail-based drilling system, or a robot. Assembly equipment 1810 may be used to assemble parts such as seats, horizontal stabilizers, wings, engines, engine housings, landing gear systems, and other parts for aircraft 1700 in FIG. 17. For example, assembly equipment 1810 may include flexible track system 115 and crawler robot 164 in vacuum track manufacturing system 106 in FIG. 1.

In this illustrative example, maintenance system 1804 includes maintenance equipment 1812. Maintenance equipment 1812 may include any equipment needed to perform maintenance on aircraft 1700 in FIG. 17. Maintenance equipment 1812 may include tools for performing different operations on parts on aircraft 1700 in FIG. 17. These operations may include at least one of disassembling parts, refurbishing parts, inspecting parts, reworking parts, manufacturing replacement parts, or other operations for performing maintenance on aircraft 1700 in FIG. 17. These operations may be for routine maintenance, inspections, upgrades, refurbishment, or other types of maintenance operations.

In the illustrative example, maintenance equipment 1812 may include ultrasonic inspection devices, x-ray imaging systems, vision systems, drills, crawlers, and other suitable types of equipment. In some cases, maintenance equipment 1812 may include fabrication equipment 1808, assembly equipment 1810, or both to produce and assemble parts that may be needed for maintenance.

Product management system 1800 also includes control system 1814. Control system 1814 is a hardware system and may also include software or other types of components. Control system 1814 is configured to control the operation of at least one of manufacturing system 1802 or maintenance system 1804. In particular, control system 1814 may control the operation of at least one of fabrication equipment 1808, assembly equipment 1810, or maintenance equipment 1812.

The hardware in control system 1814 may be using hardware that may include computers, circuits, networks, and other types of equipment. The control may take the form of direct control of manufacturing equipment 1806. For example, robots, computer-controlled machines, and other equipment may be controlled by control system 1814. In other illustrative examples, control system 1814 may manage operations performed by human operators 1816 in manufacturing or performing maintenance on aircraft 1700. For example, control system 1814 may assign tasks, provide instructions, display models, or perform other operations to manage operations performed by human operators 1816. In these illustrative examples, vacuum track manufacturing system 106 can be controlled by control system 1814 to manage at least one of the manufacturing or maintenance of aircraft 1700 in FIG. 17. As another example, control system 1814 may include controller 190, which operates to control the operation of vacuum track manufacturing system 106 in FIG. 1. For example, controller 190 can coordinate the operation of crawler robot 164 and additional crawler robot 182 to perform manufacturing operations 108 on structure 102.

In the different illustrative examples, human operators 1816 may operate or interact with at least one of manufacturing equipment 1806, maintenance equipment 1812, or control system 1814. This interaction may be performed to manufacture aircraft 1700 in FIG. 17.

Of course, product management system 1800 may be configured to manage other products other than aircraft 1700 in FIG. 17. Although product management system 1800 has been described with respect to manufacturing in the aerospace industry, product management system 1800 may be configured to manage products for other industries. For example, product management system 1800 can be configured to manufacture products for the automotive industry as well as any other suitable industries.

The illustrative examples provide a method, an apparatus, and a system for flexible track system 115. Flexible track system 115 can be attached to surface 120 of structure 102 using vacuum cup system 112. Flexible tracks 110 in flexible track system 115 have at least one of desired distance 118 from surface 120 of structure 102 or angle 132 with respect to surface 120 of structure 102.

In the illustrative examples describe above, one or more technical solutions are present that overcome a technical problem with attaching a flexible track system that maintains a desired distance from surface 120 of structure 102 on which manufacturing operations 108 are performed. As a result, one or more technical solutions may provide a technical effect of enabling automation of manufacturing operations on a structure. For example, the illustrative example may provide one or more technical solutions in which at least one of desired distance 118 from surface 120 or angle is maintained for flexible tracks 110 in flexible track system 115. One or more technical solutions enable crawler robot 164 to perform manufacturing operations 108 with at least one of desired distance 118 from surface 120 of structure 102 or angle 132 with respect to surface 120 of structure 102. In other words, desired distance 118 from surface 120 results in a desired height for flexible tracks 110.

For example, one or more technical solutions enable positioning crawler robot 164 such that the tool for crawler robot 164 has an orientation that is substantially perpendicular to surface 120 of structure 102. In this manner, crawler robot 164 can perform manufacturing operations 108 such as machining, installing fasteners, and other types of manufacturing operations that require a particular angle for distance from the surface of the structure. With the ability to maintain at least one of desired distance 118 or angle 132 of flexible tracks 110 with respect to surface 120 of structure 102, crawler robots can perform manufacturing operations in an automated manner without using human operators.

Thus, one or more illustrative examples can be employed to perform manufacturing operations 108 on structure 102. In one illustrative example, vacuum track manufacturing system 106 can be placed along splice 101 in a fuselage section to perform manufacturing operations 108 that join parts of the fuselage section to form splice 101. For example, first flexible track 156 and second flexible track 158 can be placed in parallel to splice 101 running longitudinally along the fuselage section to perform manufacturing operations 108 to form splice 101.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component may be configured to perform the action or operation described. For example, the component may have a configuration or design for a structure that provides the component an ability to perform the action or operation that is described in the illustrative examples as being performed by the component.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A track manufacturing system comprising:
   flexible tracks;
   a base attaching system attached to a surface of a structure; and
   a variable height base system that connects the base attaching system to the flexible tracks and maintains a desired distance between the flexible tracks and the surface such that the flexible tracks bridge structural frames on the surface of the structure, wherein the variable height base system comprises bases comprising heights selected to maintain the flexible tracks at the desired distance from the surface of the structure such that the flexible tracks match a contour of the structure, and wherein a base among the bases in the variable height base system is configured to set an angle for a flexible track in the flexible tracks connected to the base such that the flexible track matches the contour of the structure at a location for the flexible track such that the flexible track is substantially perpendicular to the surface.

2. The track manufacturing system of claim 1, wherein the flexible tracks comprise:
   a first flexible track; and
   a second flexible track, wherein the second flexible track is parallel to the first flexible track and wherein the first flexible track and the second flexible track are positioned in parallel with a splice in the structure.

3. The track manufacturing system of claim 1, wherein the structure is a fuselage section having a radius that decreases and wherein angles for the bases for the flexible tracks increase as the radius decreases.

4. The track manufacturing system of claim 1, wherein the variable height base system further comprises:
   frames connected to the bases and the flexible tracks, wherein the bases are connected to the base attaching system.

5. The track manufacturing system of claim 4, wherein a frame in the frames is rotatably connected to the base to set the angle for the flexible track connected to the frame in a manner that causes the flexible track to match the contour of the structure at the location of the flexible track on the structure.

6. The track manufacturing system of claim 4, wherein the base has an angled end connected to the frame, wherein the angled end has the angle that causes the flexible track to match the contour of the structure at the location of the flexible track on the structure.

7. The track manufacturing system of claim 1, wherein the flexible tracks, the base attaching system, and the variable height base system form a flexible track system and further comprising:
   a positioning system, wherein the positioning system extends from the variable height base system and is configured to connect to a group of features for the structure to position the flexible track system in a desired position on the structure for properly performing manufacturing operations.

8. The track manufacturing system of claim 7, wherein the group of features comprises a group of window openings in the structure, wherein the positioning system comprises a group of window plugs and link pins that connect the group of window plugs to the variable height base system, and wherein the flexible track has a desired position on the surface of the structure when the group of window plugs is connected to the group of window openings.

9. The track manufacturing system of claim 7, wherein the base attaching system is a vacuum cup system and wherein the positioning system provides support for the flexible tracks in case a vacuum loss occurs in the vacuum cup system while the vacuum cup system is attached to the surface of the structure.

10. The track manufacturing system of claim 1, wherein the flexible tracks comprise a first flexible track and a second flexible track that are parallel to each other and further comprising:
    spreader bars configured to connect to the first flexible track and the second flexible track such that a desired span is present between the first flexible track and the second flexible track such that the first flexible track and the second flexible track are equidistant to each other.

11. The track manufacturing system of claim 10, wherein the spreader bars bridge a splice between a first flexible track and a second flexible track.

12. The track manufacturing system of claim 1 further comprising:
    a crawler robot configured to move along the flexible tracks and perform manufacturing operations.

13. The track manufacturing system of claim 12 further comprising:
    a support system configured to position the crawler robot on the flexible tracks.

14. The track manufacturing system of claim 12, wherein the flexible tracks and the crawler robot are located on inner mold line (IML) side of the structure and further comprising:
    an additional track system with additional flexible tracks located on an outer mold line side of the structure; and
    an additional crawler robot configured to move along the additional flexible tracks and perform the manufacturing operations wherein a controller coordinates operation of the crawler robot and the additional crawler robot to perform the manufacturing operations.

15. The track manufacturing system of claim 1, wherein the flexible tracks, the base attaching system, and the variable height base system form a flexible track system.

16. The track manufacturing system of claim 15 further comprising:

a support system configured to position the flexible track system at a desired position on the surface of the structure.

17. The track manufacturing system of claim 15 further comprising:
a number of track clamps connected to frames connected to the bases and the flexible tracks, wherein the number of track clamps is configured to clamp a structural frame on the structure.

18. The track manufacturing system of claim 1, wherein the surface is on one of an inner mold line side and an outer mold line side of the structure.

19. A method for fabricating a portion of an aircraft using the track manufacturing system of claim 1.

20. A method for moving a crawler robot on a structure, the method comprising:
bridging structural frames on a surface of the structure, wherein the surface is on one of: an inner mold line side and an outer mold line side of the structure, via attaching a flexible track system to the surface of the structure via:
shaping flexible tracks comprising a first flexible track and a second flexible track to correspond to a contour in the surface of the structure;
attaching a vacuum cup system to the surface;
connecting, via a variable height base system, the vacuum cup system to the flexible tracks;
maintaining a desired distance between the flexible tracks and the surface via connecting bases connected to the vacuum cup system to frames connected to the flexible tracks, such that:
the frames maintain the flexible tracks at the desired distance from the surface of the structure;
the flexible tracks match the contour of the structure; and
a base in the bases is configured to set an angle for a flexible track in the flexible tracks matching the contour of the structure at a location for the flexible track by at least one of:
rotatably connecting to a frame in the frames to set the angle for the flexible track connected to the frame in a manner causing the flexible track to match the contour of the structure at the location of the flexible track on the structure; or
connecting an angled end to the frame such that the angled end comprises the angle causing the flexible track to match the contour of the structure at the location of the flexible track on the structure in which in a configuration of at least one of: the variable height base system, or the vacuum cup system enables the flexible tracks to bridge structural frames on the surface of the structure;
extending a positioning system from the variable height base system;
connecting the positioning system to a group of features for the structure;
positioning the flexible track system in a desired position on the structure for performing manufacturing operations on the structure; and
connecting spreader bars to the first flexible track and the second flexible track such that a desired span is present between the first flexible track and the second flexible track in which the spreader bars bridge a splice between the first flexible track and the second flexible track; and
moving the crawler robot on the flexible track system attached to the surface of the structure.

21. The method of claim 20, wherein the bridging step comprises:
bridging the structural frames on the surface of the structure with the flexible track system attached to the surface of the structure, wherein the flexible track system comprises flexible tracks, a base attaching system, and a base system connecting the base attaching system and the flexible tracks to each other and in which the base system enables the flexible tracks to bridge structural frames on the surface of the structure.

22. The method of claim 20 further comprising:
performing the manufacturing operations on the structure using the crawler robot.

23. The method of claim 20 further comprising:
attaching the crawler robot to the flexible track system.

24. The method of claim 23, further comprising:
attaching the first flexible track and the second flexible track in parallel to each other and such that the first flexible track and the second flexible track are positioned in parallel with a splice in the structure.

25. The method of claim 20, wherein the flexible track system and the crawler robot are located on the inner mold line side of the structure and wherein an additional track system with additional flexible tracks is located on the outer mold line side of the structure and an additional crawler robot is configured to move along the additional flexible tracks and perform the manufacturing operations and further comprising:
coordinating the crawler robot and the additional crawler robot to perform the manufacturing operations on the structure.

26. A method for fabricating a portion of an aircraft using the track manufacturing system of claim 20.

27. A method for installing a flexible track system, the method comprising:
selecting at least one of a number of heights or a number of angles for a variable height base system connecting a base attaching system and flexible tracks in the flexible track system to each other;
shaping the flexible tracks comprising a first flexible track and a second flexible track to correspond to a contour in a surface of a structure;
attaching a vacuum cup system to the surface;
connecting the vacuum cup system to the flexible tracks;
maintaining a desired distance between the flexible tracks and the surface via connecting bases connected to the vacuum cup system to frames connected to the flexible tracks, such that:
the frames maintain the flexible tracks at the desired distance from the surface of the structure;
the flexible tracks match the contour of the structure; and
a base in the bases sets an angle for the flexible tracks to match the contour of the structure at a location for the flexible track by at least one of:
rotatably connecting to a frame in the frames to set the angle for the flexible track connected to the frame in a manner causing the flexible track to match the contour of the structure at the location of the flexible track on the structure; or
connecting an angled end to the frame such that the angled end comprises the angle causing the flexible track to match the contour of the structure at the location of the flexible track on the structure in which in a configuration of at least one of: the variable height base system, or the vacuum cup system enables the flexible tracks to bridge structural frames on the surface of the structure;

extending a positioning system from the variable height base system;

connecting the positioning system to a group of features for the structure;

positioning the flexible track system in a desired position on the structure for performing manufacturing operations on the structure; and connecting spreader bars to the first flexible track and the second flexible track such that a desired span is present between the first flexible track and the second flexible track in which the spreader bars bridge a splice between the first flexible track and the second flexible track.

28. The method of claim 27, attaching the flexible track system to the surface of the structure comprises:

installing the spreader bars between the first flexible track in the flexible tracks and the second flexible track in the flexible tracks, wherein the spreader bars bridge a splice between the first flexible track and the second flexible track.

29. The method of claim 27, wherein attaching the flexible track system to the surface of the structure comprises:

attaching the flexible track system to the surface of the structure on an inner mold line side of the structure or an outer mold line side of the structure.

30. The method of claim 27, wherein attaching the flexible track system to the structure comprises applying a vacuum to the vacuum cup system such that the vacuum cup system is attached to the surface of the structure.

31. The method of claim 30, wherein attaching the flexible track system to the structure further comprises:

attaching the flexible track system to a group of features on the structure to attach the flexible track system to a desired position on the structure.

32. The method of claim 31, further comprising:

installing a group of window plugs into a group of window openings in the structure;

positioning the flexible track system relative to the group of window plugs; and connecting the flexible track system to the group of window plugs.

33. The method of claim 32, wherein connecting the flexible track system to the group of window plugs comprises:

connecting link pins to the frames in the variable height base system in first tracks in the flexible track system and the group of window plugs.

34. The method of claim 33, wherein positioning the flexible track system relative to the group of window plugs comprises:

moving a cart holding the flexible track system relative to the group of window plugs installed in the group of window openings such that the flexible track system is in a position for connection to the group of window plugs.

35. The method of claim 27, wherein the structure is a fuselage section having a radius that decreases and wherein angles for the bases for the flexible tracks increase as the radius decreases.

36. A portion of an aircraft assembled according to the method of claim 27.

37. A vacuum track manufacturing system that comprises:

flexible tracks comprising a first flexible track and a second flexible track, such that the first flexible track and the second flexible track are configured to bend to correspond to a contour in a surface of a structure;

a vacuum cup system attached to the surface;

a variable height base system that connects the vacuum cup system to the flexible tracks;

wherein the variable height base system comprises:

bases connected to the vacuum cup system;

frames that connect the bases to the flexible tracks, such that:

the frames maintain the flexible tracks at a desired distance from the surface of the structure;

the flexible tracks match the contour of the structure; and a base in the bases is configured to set an angle for a flexible track in the flexible tracks such that the flexible track matches the contour of the structure at a location for the flexible track by at least one of:

being rotatably connected to a frame in the frames to set the angle for the flexible track connected to the frame in a manner that causes the flexible track to match the contour of the structure at the location of the flexible track on the structure; or having an angled end connected to the frame such that the angled end comprises the angle that causes the flexible track to match the contour of the structure at the location of the flexible track on the structure in which in a configuration of at least one of the variable height base system or the vacuum cup system enables the flexible tracks to bridge structural frames on the surface of the structure;

a positioning system, wherein the positioning system extends from the variable height base system and is configured to connect to a group of features for the structure to position the flexible tracks in a desired position on the structure for performing manufacturing operations on the structure;

spreader bars configured to connect to the first flexible track and the second flexible track such that a desired span is present between the first flexible track and the second flexible track in which the spreader bars bridge a splice between the first flexible track and the second flexible track; and a crawler robot configured to move along the flexible tracks and perform the manufacturing operations on the structure.

38. The vacuum track manufacturing system of claim 37, wherein the flexible tracks and the crawler robot are located on inner mold line side of the structure and further comprising:

an additional track system with additional flexible tracks located on an outer mold line side of the structure; and an additional crawler robot configured to move along the additional flexible tracks and perform the manufacturing operations wherein a controller coordinates an operation of the crawler robot and the additional crawler robot to perform the manufacturing operations.

39. A method for fabricating a portion of an aircraft via using a vacuum track manufacturing system comprising:

shaping flexible tracks comprising a first flexible track and a second flexible track to correspond to a contour in a surface of a structure;

attaching a vacuum cup system to the surface;

connecting, via a variable height base system, the vacuum cup system to the flexible tracks;

maintaining a desired distance between the flexible tracks and the surface via connecting bases connected to the vacuum cup system to frames connected to the flexible tracks, such that:
- the frames maintain the flexible tracks at the desired distance from the surface of the structure;
- the flexible tracks match the contour of the structure; and
- a base in the bases is configured to set an angle for a flexible track in the flexible tracks matching the contour of the structure at a location for the flexible track by at least one of:
  - rotatably connecting to a frame in the frames to set the angle for the flexible track connected to the frame in a manner causing the flexible track to match the contour of the structure at the location of the flexible track on the structure; or
  - connecting an angled end to the frame such that the angled end comprises the angle causing the flexible track to match the contour of the structure at the location of the flexible track on the structure in which in a configuration of at least one of: the variable height base system, or the vacuum cup system enables the flexible tracks to bridge structural frames on the surface of the structure;

extending a positioning system from the variable height base system;
connecting the positioning system to a group of features for the structure;
positioning the vacuum track manufacturing system in a desired position on the structure for performing manufacturing operations on the structure;
connecting spreader bars to the first flexible track and the second flexible track such that a desired span is present between the first flexible track and the second flexible track in which the spreader bars bridge a splice between the first flexible track and the second flexible track; and
moving a crawler robot along the flexible tracks and performing the manufacturing operations on the structure.

40. A method for moving a crawler robot on a surface of a structure, the method comprising:
connecting a flexible track system relative to a group of features for the structure using a positioning system to position the flexible track system in a desired position on the structure for properly performing manufacturing operations, via
  shaping flexible tracks comprising a first flexible track and a second flexible track to correspond to a contour in the surface of the structure;
  attaching a vacuum cup system to the surface;
  connecting, via a variable height base system, the vacuum cup system to the flexible tracks;
  maintaining a desired distance between the flexible tracks and the surface via connecting bases connected to the vacuum cup system to frames connected to the flexible tracks, such that:
    the frames maintain the flexible tracks at the desired distance from the surface of the structure;
    the flexible tracks match the contour of the structure; and
    a base in the bases is configured to set an angle for a flexible track in the flexible tracks matching the contour of the structure at a location for the flexible track by at least one of:
      rotatably connecting to a frame in the frames to set the angle for the flexible track connected to the frame in a manner causing the flexible track to match the contour of the structure at the location of the flexible track on the structure; or
      connecting an angled end to the frame such that the angled end comprises the angle causing the flexible track to match the contour of the structure at the location of the flexible track on the structure in which in a configuration of at least one of: the variable height base system, or the vacuum cup system enables the flexible tracks to bridge structural frames on the surface of the structure;
  extending a positioning system from the variable height base system;
  connecting the positioning system to a group of features for the structure;
  positioning the flexible track system in a position on the structure for performing manufacturing operations on the structure; and
  connecting spreader bars to the first flexible track and the second flexible track such that a desired span is present between the first flexible track and the second flexible track in which the spreader bars bridge a splice between the first flexible track and the second flexible track;
attaching the crawler robot to the flexible track system;
moving the crawler robot on the flexible track system attached to the surface of the structure; and
performing the manufacturing operations on the structure using the crawler robot.

41. The method of claim 40 further comprising:
supporting the flexible track system in case a vacuum loss occurs in the vacuum cup system while the vacuum cup system is attached to the surface of the structure.

42. A portion of an aircraft assembled according to the method of claim 40.

* * * * *